United States Patent
Kitahara et al.

(10) Patent No.: US 7,082,539 B1
(45) Date of Patent: Jul. 25, 2006

(54) INFORMATION PROCESSING APPARATUS

(75) Inventors: Jun Kitahara, Kawasaki (JP); Takeshi Asahi, Kawasaki (JP); Toru Owada, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/889,410

(22) PCT Filed: Mar. 6, 2000

(86) PCT No.: PCT/JP00/01333

§ 371 (c)(1),
(2), (4) Date: Jul. 17, 2001

(87) PCT Pub. No.: WO00/57278

PCT Pub. Date: Sep. 28, 2000

(30) Foreign Application Priority Data

Mar. 19, 1999 (JP) ........................ PCT/JP99/01402

(51) Int. Cl.
*G06F 12/14* (2006.01)
(52) U.S. Cl. ...................................... 713/189; 713/200
(58) Field of Classification Search ................. 713/200
See application file for complete search history.

(56) References Cited

U.S. PATENT DOCUMENTS

| | | | | |
|---|---|---|---|---|
| 5,111,504 A | * | 5/1992 | Esserman et al. | 380/281 |
| 5,224,166 A | * | 6/1993 | Hartman, Jr. | 713/190 |
| 5,512,977 A | * | 4/1996 | Imai | 399/366 |
| 5,535,168 A | * | 7/1996 | Yepez et al. | 365/227 |
| 5,592,549 A | * | 1/1997 | Nagel et al. | 705/52 |
| 5,748,744 A | * | 5/1998 | Levy et al. | 380/52 |
| 5,805,712 A | * | 9/1998 | Davis | 713/173 |
| 5,892,974 A | * | 4/1999 | Koizumi et al. | 710/16 |
| 5,909,700 A | * | 6/1999 | Bitner et al. | 711/162 |
| 5,933,500 A | * | 8/1999 | Blatter et al. | 380/200 |
| 5,990,873 A | * | 11/1999 | Yamamoto et al. | 345/173 |
| 5,999,629 A | * | 12/1999 | Heer et al. | 705/51 |
| 6,292,899 B1 | * | 9/2001 | McBride | 713/200 |
| 6,473,861 B1 | * | 10/2002 | Stokes | 713/193 |
| 6,571,263 B1 | * | 5/2003 | Nagai | 708/3 |
| 2001/0042043 A1 | * | 11/2001 | Shear et al. | 705/51 |
| 2003/0158754 A1 | * | 8/2003 | Elkind | 705/3 |

FOREIGN PATENT DOCUMENTS

| | | |
|---|---|---|
| JP | 64-041947 | 2/1989 |
| JP | 2-297626 | 12/1990 |
| JP | 4-149652 | 5/1992 |
| JP | 04-163768 | 6/1992 |
| JP | 05-53921 | 3/1993 |
| JP | 5-314014 | 11/1993 |

(Continued)

*Primary Examiner*—Emmanuel L. Moise
*Assistant Examiner*—Kevin Schubert
(74) *Attorney, Agent, or Firm*—Mattingly, Stanger, Malur & Brundidge, P.C.

(57) ABSTRACT

Since a conventional information processing apparatus includes a plurality of semiconductor devices, there is a problem that sensitive information may reside on a system bus in the apparatus or a semiconductor memory device serving as main memory therein. To obviate this problem, each information processing apparatus has a CPU which includes a microprocessor, a cryptographic processing algorithm ROM, a cryptographic processing hardware circuit, a RAM, a key custody area, and an external bus controller, which are all integrated on a single semiconductor chip. Thus, encryption/decryption processing is carried out only in the CPU, and internal operations of the CPU are made non-analyzable from an external signal of the CPU.

11 Claims, 23 Drawing Sheets

FOREIGN PATENT DOCUMENTS

| | | |
|---|---|---|
| JP | 9-044407 | 2/1997 |
| JP | 10-214233 | 8/1998 |
| JP | 10-275115 | 10/1998 |

* cited by examiner

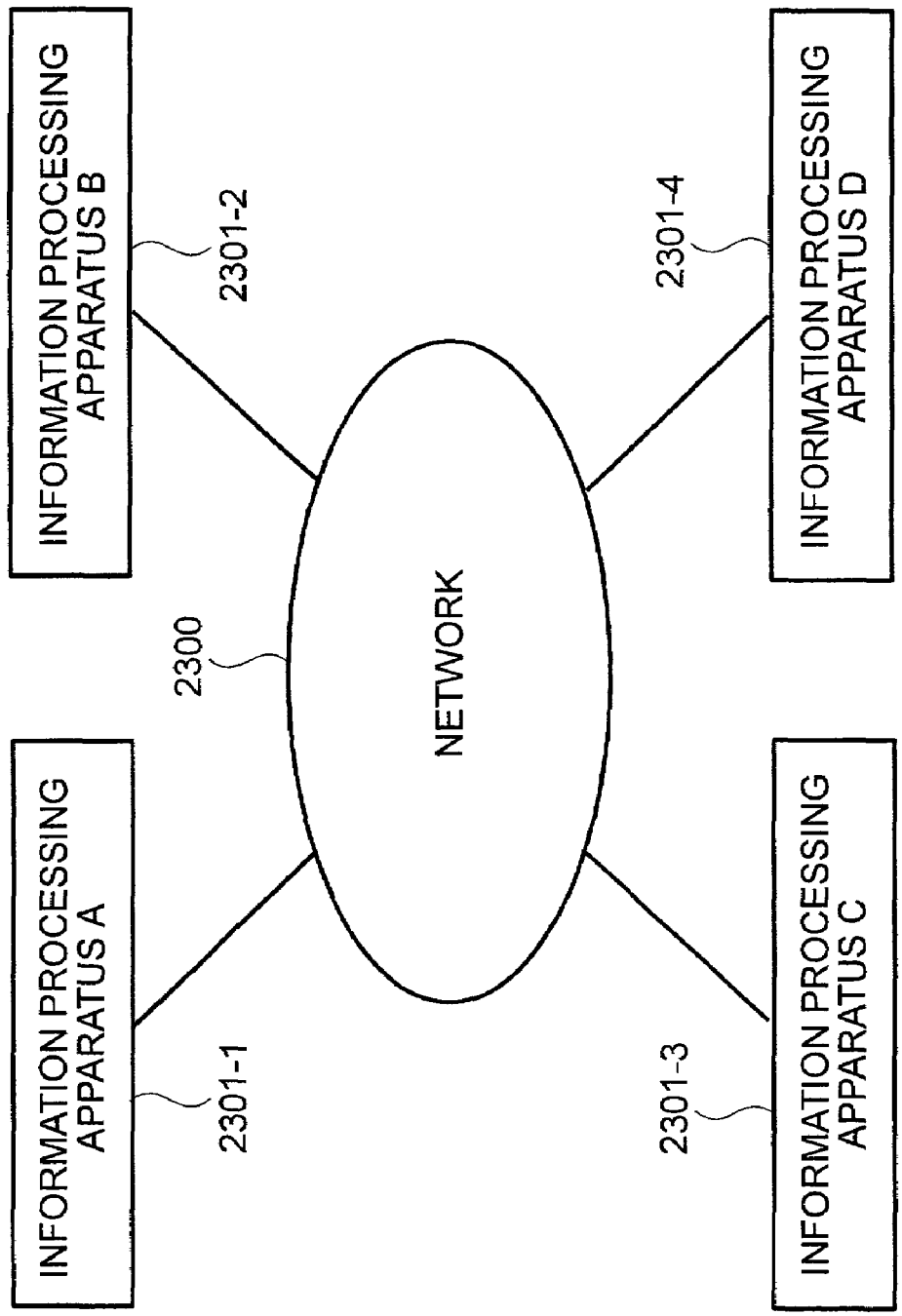

INFORMATION PROCESSING APPARATUS

TECHNICAL FIELD

The present invention relates to an information processing apparatus using cryptography for ensuring the security of sensitive information in storage and transfer thereof, and more particularly to an information processing architecture for providing high-level information security protection.

BACKGROUND ART

The following conventional techniques for an information processing apparatus using cryptography are known.

In JP-A-275115/1998, there is disclosed a cryptographic technique of encrypting information and storing the encrypted information into an external storage device such as a hard disk drive. In this conventional cryptographic technique, when encrypted data Ya and Yb stored in an external storage device 12 are transferred to an information terminal unit 11, the encrypted data Ya and Yb are decrypted in succession using a deciphering key Kb held in an enciphering/deciphering key custody area 35.

JP-A-214233/1998 discloses another cryptographic technique of providing a dedicated cryptographic processor in an information processing apparatus. According to this conventional cryptographic technique, the cryptographic processor for encrypting data to generate a body of a secure file is equipped in a portable-type personal computer.

In common applications of encryption and decryption processing, sensitive information to be kept in secrecy resides in main memory since data processing is carried out on the main memory. For information encryption in which information is processed through an encryption algorithm, it is required to securely handle the encryption algorithm, cipher key information, and sensitive information to be encrypted.

The above-cited conventional cryptographic techniques, however, give rise to the following problems:

In the conventional cryptographic techniques, since sensitive information and intermediate results of encryption processing are held in main memory, there is a problem that the sensitive information may be extracted by any means. In an information processing apparatus comprising a plurality of semiconductor devices serving as a CPU, main memory and other circuits, when encryption processing is carried out under control of the CPU, an encryption algorithm, sensitive information to be encrypted, and intermediate results of the encryption processing are held in the main memory, causing the above problem of information extractability.

Further, since the information processing apparatus contains signal lines (e.g., bus lines) for interconnecting semiconductor device components thereof, data prior to encryption or decrypted data may be easily extracted by means of tapping the signal line and analyzing data attained through the tapping.

In JP-A-297626/1990, it has been proposed to provide a cryptographic technique of delivering encrypted data to external signal lines. In this conventional cryptographic technique, key information necessary for encryption is supplied from an external source. Therefore, unless security protection of the key information is ensured, there arises a problem that data encryption becomes useless.

DISCLOSURE OF THE INVENTION

It is therefore an object of the present invention to overcome the above-mentioned disadvantages by providing an information processing apparatus which is configured to have the following features:

Encryption processing is carried out within a semiconductor device contained in the information processing apparatus. Key information necessary for encryption is also generated in the semiconductor device. Information regarding encryption is not output onto signal lines arranged in the information processing apparatus. Information which does not affect security protection even if tapped by any other person, such as encrypted information or information not requiring encryption, is output onto the signal lines in the information processing apparatus. The information regarding encryption includes information which is not yet encrypted and information to be used for decryption.

More specifically, according to one aspect of the present invention, there is provided an information processing apparatus in which a semiconductor chip serving as a CPU thereof integrally contains a RAM, a cryptographic processing algorithm memory, a cryptographic processing hardware circuit, a key information generating hardware circuit, and a key information storage hardware circuit. In the present invention, the term "CPU" is used for the sake of convenience. Any semiconductor chip in the information processing apparatus is applicable in lieu of the CPU. In particular, it is preferable to adopt a processor which carries out control and computational operations in the information processing apparatus. That is to say, the present invention provides an information processing apparatus comprising a semiconductor chip in which encryption processing including generation of key information is performed in a closed fashion. Further, according to another aspect of the present invention, there may be provided such an arrangement that encryption processing is performed in each of a plurality of CPUs.

Furthermore, according to another aspect of the present invention, encryption processing may be performed in the RAM contained in the CPU.

Moreover, according to another aspect of the present invention, the RAM contained in the CPU may be used as main memory for execution of application programs as well as encryption processing.

Still further, according to another aspect of the present invention, there may be provided such an arrangement that application programs themselves are encrypted and an external storage device holds encrypted files thereof.

Still further, according to another aspect of the present invention, an external bus controller may be provided for controlling data output to an external bus. The external bus controller may control data output so that data is not output to the external bus while the RAM contained in the CPU is accessed. Further, the external bus controller may form a judgment on whether or not to output data to the external bus. If it is judged that data is to be output, the data is delivered to the external bus.

Still further, according to another aspect of the present invention, encryption and decryption of communication data may be performed in the CPU.

Still further, in any of these arrangements mentioned above, it is also preferable to provide means for determining whether or not to encrypt data according to the contents thereof. If encryption is not necessary for data, the data is output onto the signal lines in the information processing apparatus.

Besides, in a modified arrangement of the present invention, encryption processing may be performed in a processor of a disk system controller for encrypting file location information on a magnetic disk.

BRIEF DESCRIPTION OF DRAWINGS

FIG. 23 is a diagram showing the entire network system in which the information processing apparatus illustrated in FIG. 15 is connected.

BEST MODE FOR CARRYING OUT THE INVENTION

The present invention will now be described in detail by way of example with reference to the accompanying drawings.

Figure 1:
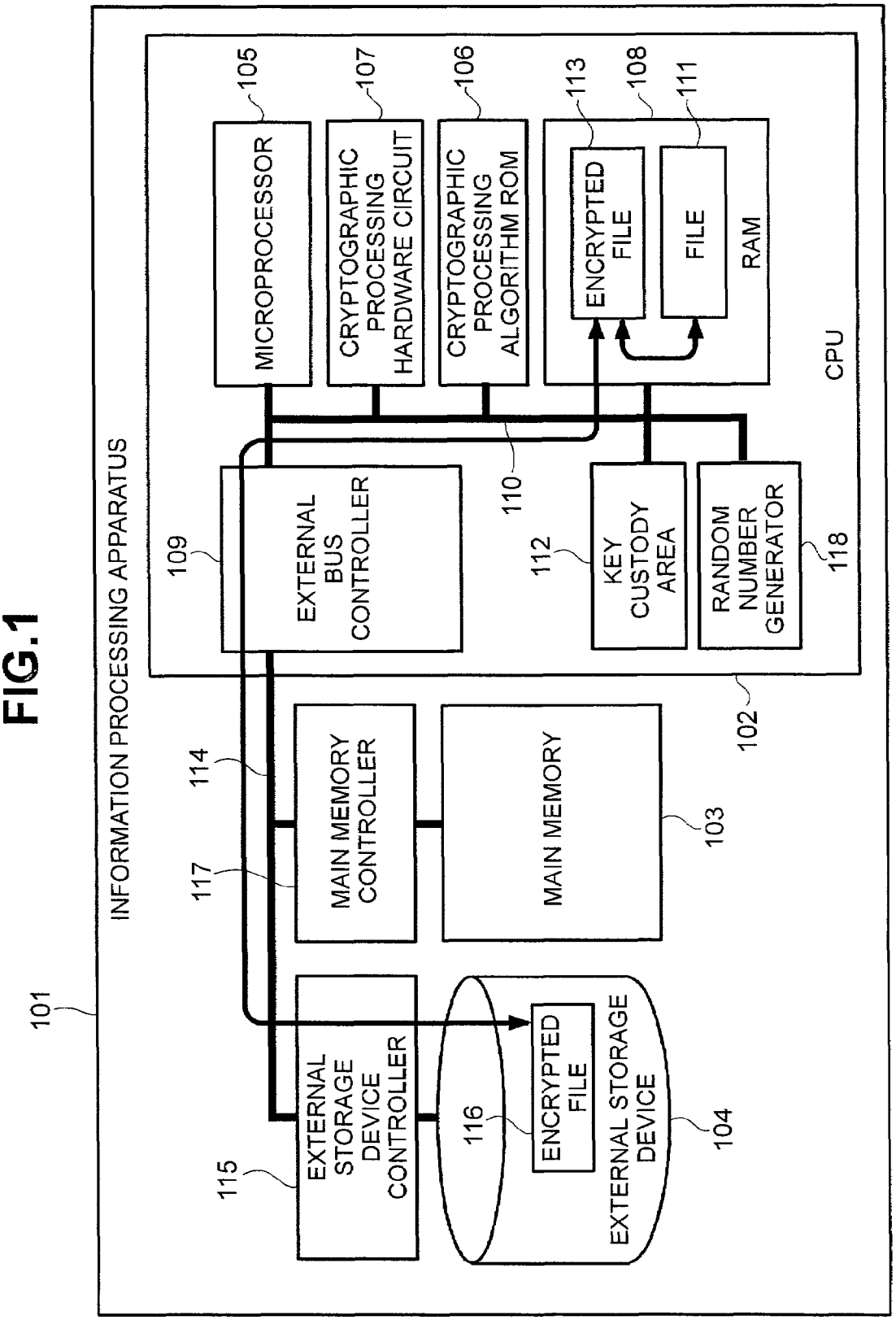
FIG. 1 is a diagram showing a configuration of an information processing apparatus according to the present invention.
Figure 2:
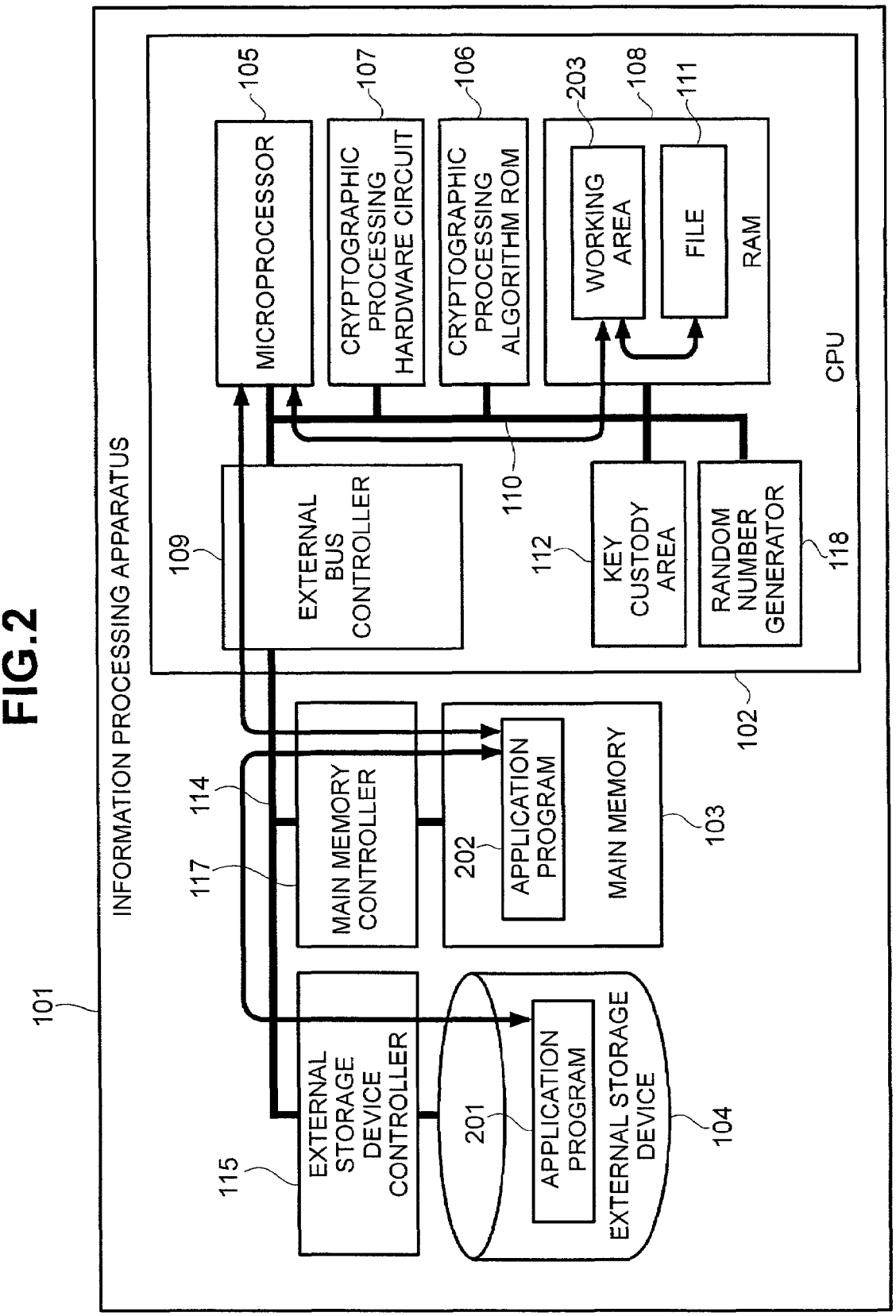
FIG. 2 is an explanatory diagram of file generation in the information processing apparatus of the present invention.
Figure 7:
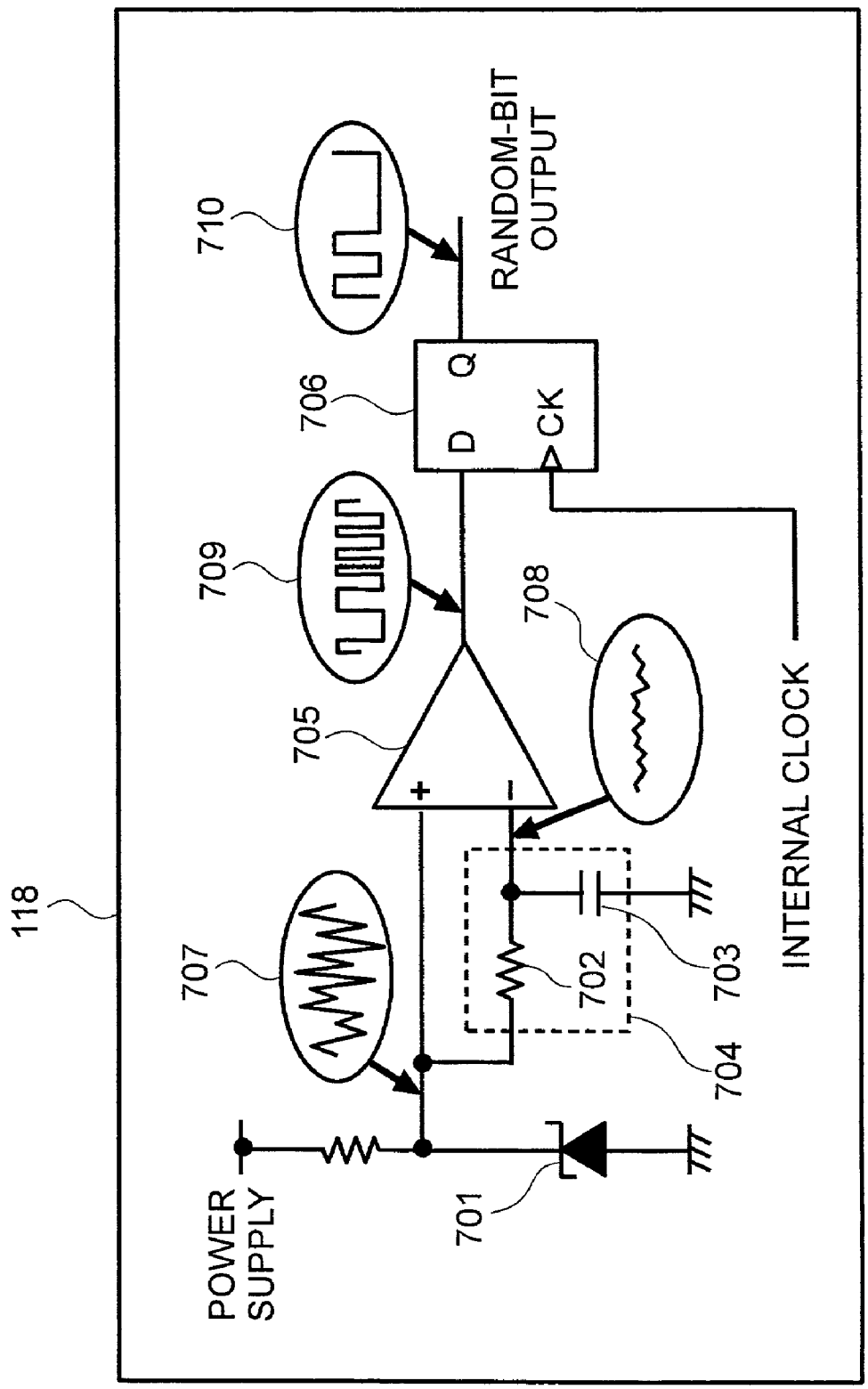
FIG. 7 is a diagram showing a configuration of a random number generator required for key generation.

Referring first FIGS. 1 and 2, the following describes a first preferred embodiment of the present invention. In FIG. 1, there is shown a schematic configuration diagram of an information processing apparatus (101) comprising at least a CPU (102), a main memory (103), and an external storage device (104). A theoretical system bus (114) is extended to connect the CPU (102), a main memory controller (117), and an external storage device controller (115). The main memory controller (117) and the external storage device controller (115) are connected to the main memory (103) and the external storage device (104), respectively. While an actual signal line connection is arranged as shown in FIG. 7, a schematic signal line connection can be represented as shown in FIG. 1 in view of a theoretical data flow.

The CPU (102) comprises a microprocessor (105), a cryptographic processing algorithm ROM (106), a cryptographic processing hardware circuit (107), a RAM (108), a key custody area (112), and an external bus controller (109). These component circuits are integrated on a single semiconductor chip.

In the CPU (102), a microprocessor bus (110) is extended to connect the cryptographic processing algorithm ROM (106), the cryptographic processing hardware circuit (107), the RAM (108), and the external bus controller (109). In the present preferred embodiment, data is encrypted within the CPU.

For encryption of a file (111), encryption processing is carried out through the cryptographic processing algorithm ROM (106), using the cryptographic processing hardware circuit (107) if necessary. Key data to be used for encryption may be generated in the CPU (102), or data prepared in advance may be used for encryption. Note that the key data must be retained in the key custody area (112) contained in the CPU (102). In encryption processing, if intermediate result data is generated, the generated intermediate result data is stored in the RAM (108). Thus, an encrypted file (113) is produced from the file (111).

The encrypted file (113) is stored into the external storage device (104) through the system bus (114) and the external storage device controller (115).

For decryption of an encrypted file (116) stored in the external storage device (104), decryption processing is carried out in the reverse order of encryption.

To be more specific, the encrypted file (116) is read into the RAM (108) from the external storage device (104) through the external storage device controller (115). Then, decryption processing is carried out through the cryptographic processing algorithm ROM (106), using the cryptographic processing hardware circuit (107) if necessary.

For encrypting/decrypting a large amount data at high speed, common key cryptography (symmetric key cryptography) is employed in which a common key is applied to both encryption and decryption. In the common key cryptography, encryption and decryption are carried out in just the reverse order to each other, i.e., identical minimum-unit processing steps are performed in encryption and decryption. The cryptographic processing algorithm ROM (106) also contains a decryption processing procedure. The cryptographic processing hardware circuit (107) is available for decryption as well as encryption.

In FIG. 2, there is shown a process through which the file (111) indicated in FIG. 1 is produced.

An application program (201) is retained in the external storage device except when it is activated. When the application program is initiated, the application program is loaded into the main memory and put in an operable state (202). Then, the application program in the operable state (202) issues a request for working area allocation to an operating system serving as a control program for the information processing apparatus. In answer to this request, the operating system for controlling the information processing apparatus allocates a memory space of the RAM (108) as a working area (203).

In the above-mentioned state, the application program (202) is executed under control of the microprocessor (105), and information is created and stored into the working area (203). of the information thus created and stored in the working area (203), data to be stored into the external storage device is produced as a file (111).

The application program (202) itself resides in the main memory. In allocation of the working area (203) on the RAM (108) for execution of the application program, a memory control function of the microprocessor is used under the aegis of the operating system for controlling the information processing apparatus. Through the use of the memory control function of the microprocessor, logical addresses representing the working area for the application program are converted into physical addresses in the RAM (108).

The key custody area (112) may be provided in the RAM (108), but it is required that the key custody area should be of a nonvolatile memory type. Instead of the RAM (108), a nonvolatile ROM such as an EEPROM or flash ROM may be used to provide the key custody area. It is also preferable to use a battery-backed SRAM in lieu of the RAM (108). Where the battery-backed SRAM is used to provide the key custody area, a backup battery power thereof can be shut off upon detection of an attack to the information processing apparatus in an attempt to take out a cipher key. Thus, key information can be deleted intentionally to safeguard sensitive information.

In an arrangement wherein information generation and cryptographic processing are carried out in the same semiconductor chip as described above, it becomes difficult to extract non-encrypted sensitive information through an analytical attack such as tapping a signal on a terminal of the semiconductor chip.

Figure 3:
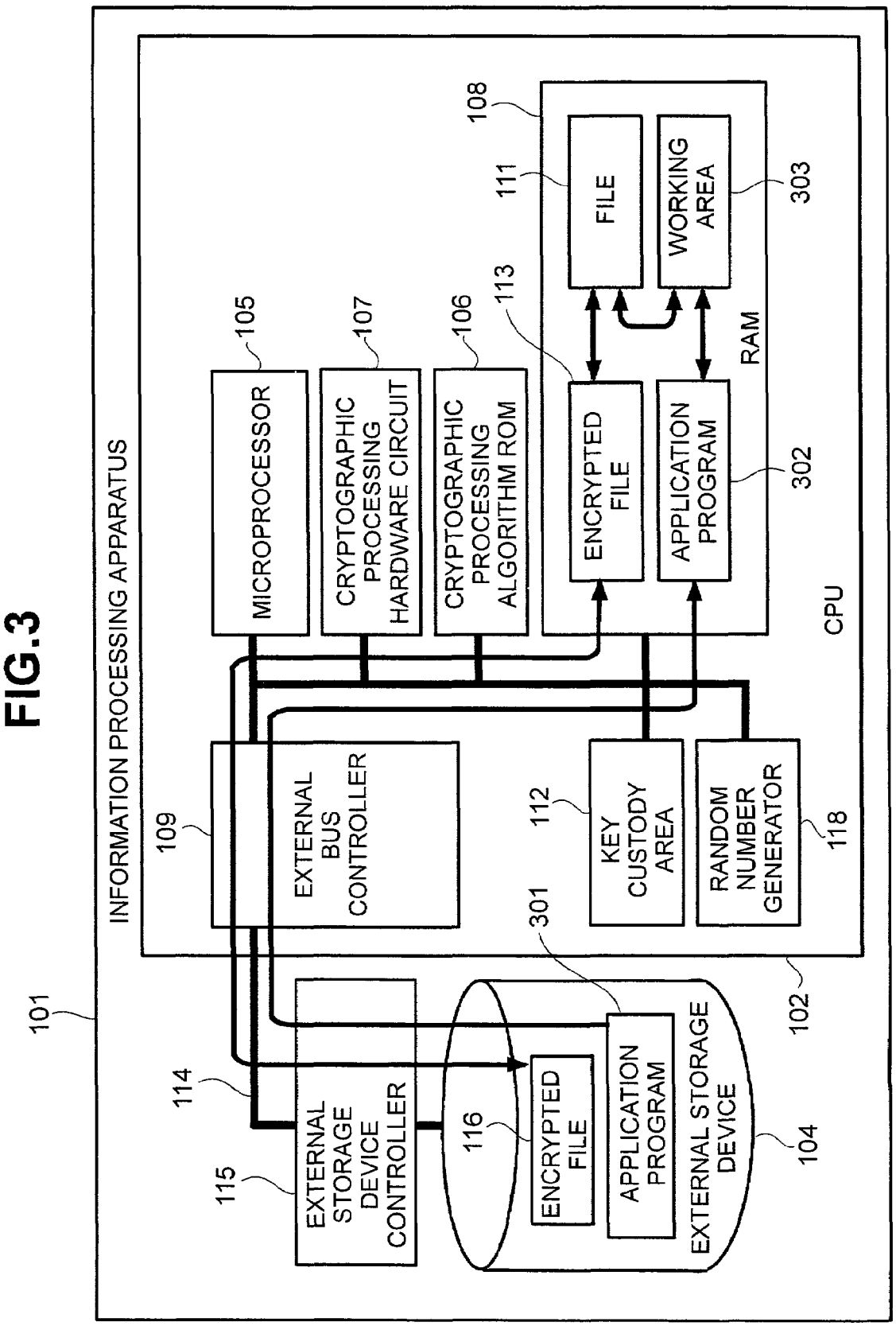
FIG. 3 is a diagram showing an information processing apparatus configuration in which a CPU contains main memory according to a preferred embodiment of the present invention.

Then, with reference to FIG. 3, the following describes a second preferred embodiment of the present invention.

In FIG. 3, there is shown a configuration wherein the RAM (108) contained in the CPU (101) is used as main memory of the information processing apparatus (101).

In the second preferred embodiment, when an application program (301) retained in the external storage device is initiated, the application program is loaded into the RAM (108) and put in an operable state (302). Then, the application program in the operable state (302) issues a request for working area allocation to an operating system serving as a control program for the information processing apparatus. In answer to this request, the operating system for controlling the information processing apparatus allocates a memory space of the RAM (108) as a working area (303). In this state, the application program (302) is executed under control of the microprocessor (105), and information is created and stored into the working area (303). Of the information thus created and stored in the working area (303), data to be stored into the external storage device is produced as a file (111).

The file (111) thus produced is encrypted through the cryptographic processing algorithm ROM (106), using the cryptographic processing hardware circuit (107) if necessary. Thus, an encrypted file (113) is produced from the file (111). The encrypted file (112) is then stored as an encrypted file (116) into the external storage device.

Although main memory disposed outside the CPU is not shown in FIG. 3, there may also be provided such a modified arrangement that application programs used for generating sensitive information and any other application programs are handled differently. To be more specific, the application programs used for generating sensitive information are carried out in the RAM (108), and the other application programs are carried out on the main memory disposed outside the CPU in a conventional manner.

Where the RAM (108) is used as the main memory as described above, a transfer of non-encrypted sensitive information takes place outside the CPU (102) only when the application program (301) is loaded into the RAM (108), and the application program itself is executed in a secure manner.

Figure 4:
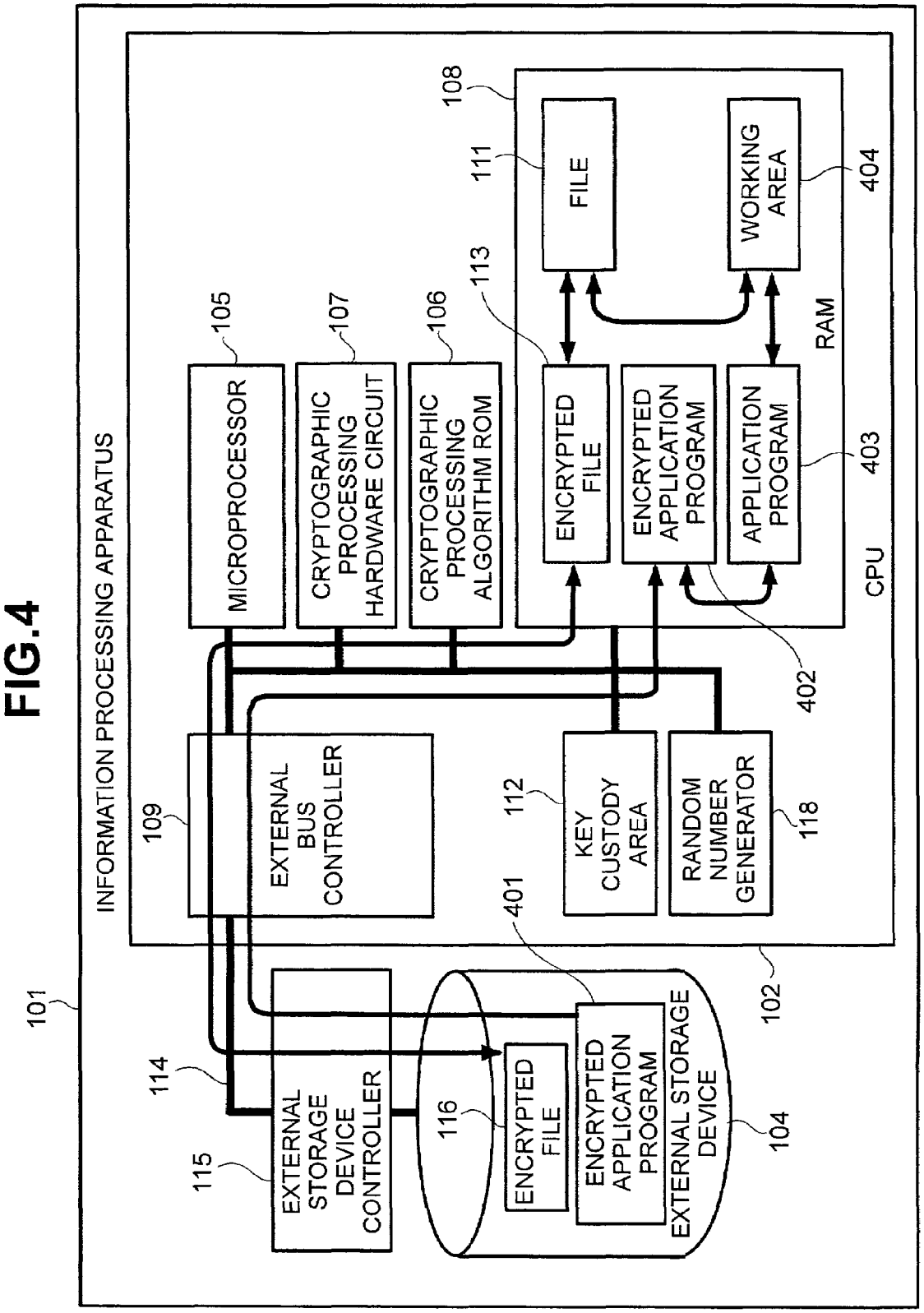
FIG. 4 is a diagram showing an information processing apparatus configuration in which an application program held in an external storage device is encrypted by a CPU according to a preferred embodiment of the present invention.

With reference to FIG. 4, the following describes a third preferred embodiment of the present invention.

In the third preferred embodiment, an encrypted application program (401) is retained in the external storage device (104). The encrypted application program is decrypted in the CPU of the information processing apparatus. Hence, a decrypted form of the application program is not output onto the bus (114), i.e., the decrypted application program is handled within the CPU in a closed fashion. This prevents any other person from tapping the application program.

The third preferred embodiment is explained in detail below. At the time of startup of the encrypted application program (401) retained in the external storage device, the encrypted application program (401) is transferred to the RAM (108) in the information processing apparatus over the bus (114). Through this transfer, the RAM (108) is loaded with the encrypted application program (402). Then, in the RAM (108), the encrypted application program (402) is decrypted in the RAM (108) to take an original form of an application program (403). In this state, the application program (403) is run to generate information using a working area (404) in the RAM (108). Then, any necessary parts are selected from the generated information to produce a file (111). The file (111) thus produced is encrypted to produce an encrypted file (113). The encrypted file (113) is stored as an encrypted file (116) into the external storage device (104).

As explained above, an application program itself is stored as an encrypted file into the external storage device, thereby enhancing security protection further.

In the third preferred embodiment, for generating the encrypted application program (401), the application program itself is encrypted as a file (111).

Figure 5:
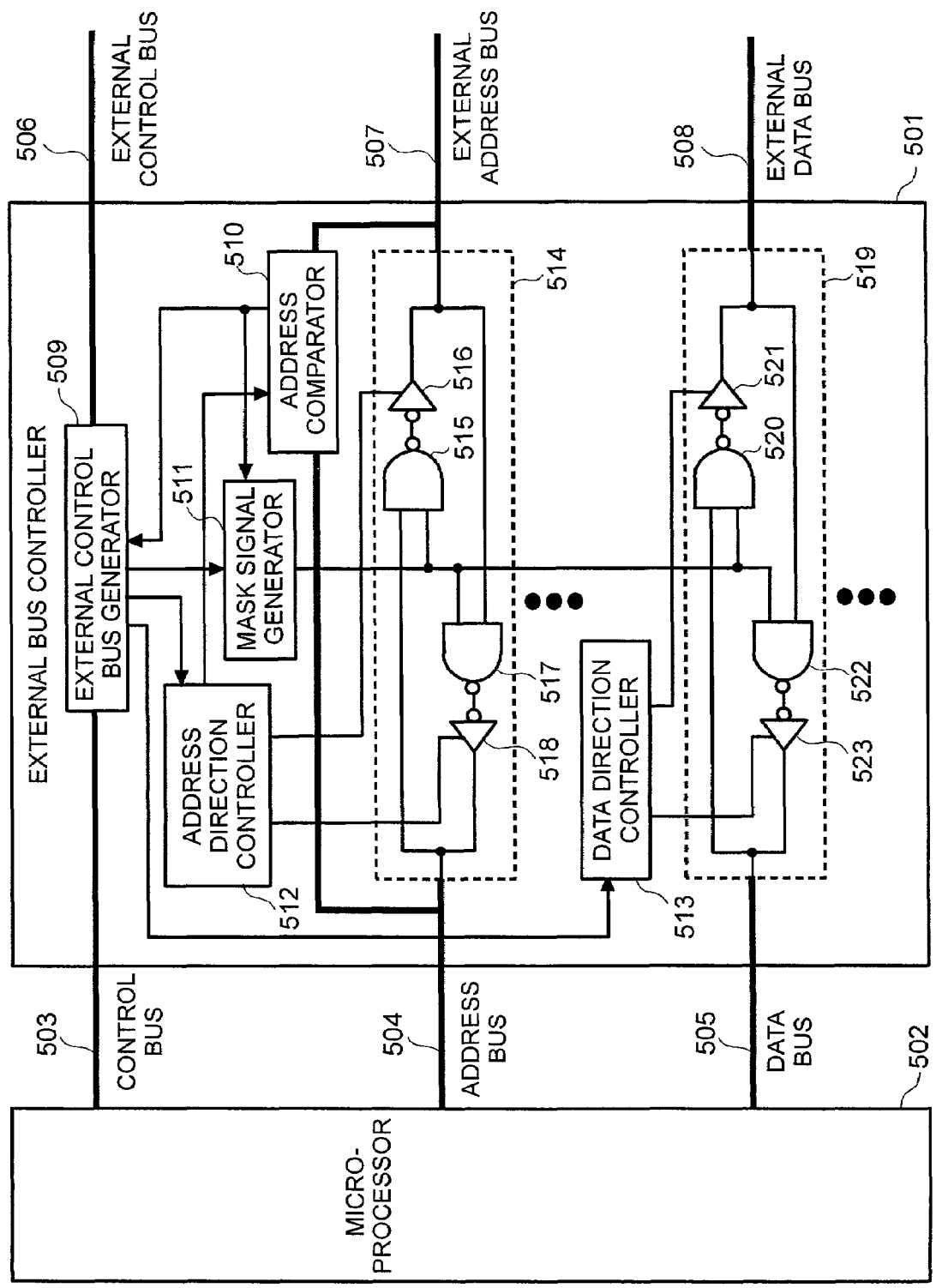
FIG. 5 is a diagram showing a configuration of an external bus controller.
Figure 6:
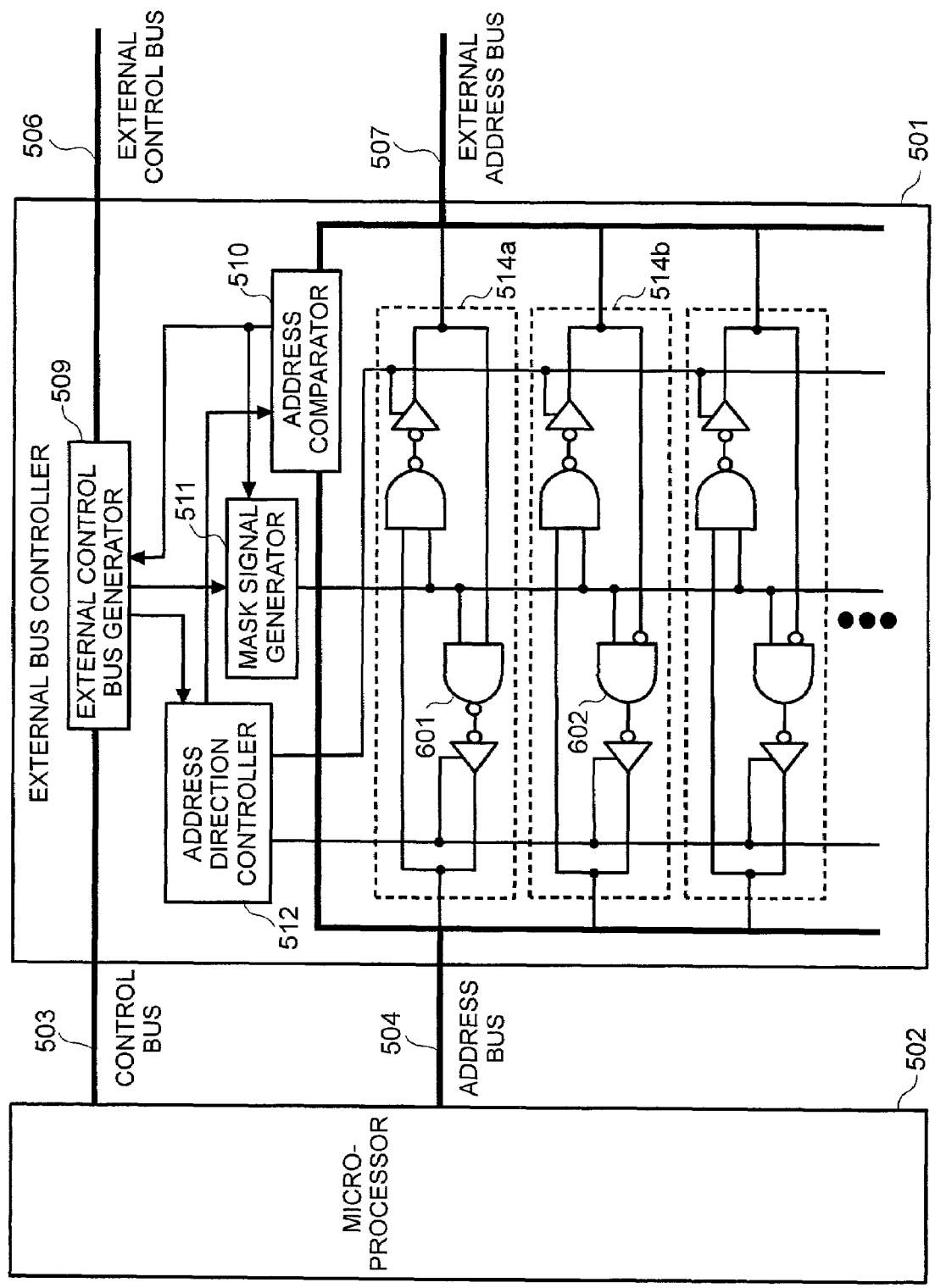
FIG. 6 is an explanatory diagram of a preferred embodiment of the present invention in which data output to an external bus is prevented by the external bus controller.

Then, with reference to FIGS. 5 and 6, the following describes the external bus controller in the present invention.

The external bus controller (109) used in each of the first to third preferred embodiments is designed to control data input/output between the inside of the CPU and the outside thereof. For example, in access from the microprocessor (105) to the cryptographic processing algorithm ROM (106), cryptographic processing hardware circuit (107) or RAM (108) for execution of cryptographic processing, the external bus controller performs control so that an access signal will not go out of the CPU. In a case where security protection is not affected when an access signal from the microprocessor (105) is output from the CPU, the external bus controller may allow output of the access signal from the CPU. Information allowed to be output from the CPU includes data which is to be transferred to another information processing apparatus without being subjected to encryption processing.

As shown in FIGS. 5 and 6, an external bus controller (501) corresponding the external bus controller (109) is disposed between a set of three internal buses from a microprocessor (502) and a set of three external buses extending out of the CPU. The three internal buses are a control bus (503), an address bus (504), and a data bus (505), and the three external buses are an external control bus (506), an external address bus (507), and an external data bus (508). The external bus controller (501) comprises an external control bus generator (509), an address comparator (510), an address direction controller (512), a data direction controller (513), a mask signal generator (511), and signal mask circuits (514) and (519).

A bus cycle start signal, a bus direction indicating signal, a bus cycle end signal, a bus arbitration signal, and other control signals from the microprocessor are fed through the control bus (503) and the external control bus (506). Bus cycle control is carried out by these signals.

The external control bus generator (509) monitors the bus cycle start signal, bus direction indicating signal, bus cycle end signal, bus arbitration signal, and other control signals from the microprocessor. In the external control bus generator (509), it is determined whether the microprocessor has a bus access right or not. Information on the result of judgment is given to the address direction controller (512), and the same information is also given to the address comparator (510). The address comparator (510) has information regarding addresses allocated to the cryptographic processing algorithm ROM (106), cryptographic processing hardware circuit (107), and RAM (108) in the CPU (102), and in the address comparator (510), these addresses are compared with an address input through the address bus (504) or the external address bus (507).

If the external control bus generator (509) judges through the control bus (503) that the microprocessor has the bus access right, the address comparator (510) checks an address signal from the microprocessor. Then, if it recognized that access to an address of the RAM (108) is attempted, the address comparator (510) notifies the external control bus generator (509) thereof so that an external bus control signal will not be driven. The address comparator (510) also notifies the mask signal generator (511) thereof so as to output a mask signal to the signal mask circuits (514) and (519). Thus, the external address bus (507) and the external data bus (508) are controlled to remain inactive. Alternatively, an address value or a data value is forcedly made invariable.

If the external control bus generator (509) judges through the control bus (503) that the microprocessor does not have the bus access right, the address comparator (510) checks the external address bus. Then, if it is detected that access to an address of the RAM (108) is attempted, the address comparator (510) notifies the external control bus generator (509) thereof. The external control bus generator (509) conducts control not to indicate a bus cycle to the control bus (503). Alternatively, a mask signal is output to the signal mask circuits (514) and (519) so that the address bus (504) and the data bus (505) will not be driven, or an address value or a data value is forcedly made invariable.

In implementation of making an address value or a data value invariable, gate logic is changed as in a gate (602) of a signal mask circuit (601) and a gate (604) of a signal mask circuit (603) shown in FIG. 6.

Thus, through the use of the address signal mask circuit, it is possible to make address conversion to indicate any area other than the RAM (108) area, i.e., an area where no problem will arise in read and write operations.

As described above, analysis of internal processing in the CPU (102) by tapping the system bus (114) connected to the CPU (102) can be made infeasible. This enhances the security of cryptographic processing to be carried out in the CPU (102).

Then, with reference to FIGS. 7 to 13, the following describes how key information is handled.

Key information is required for encryption and decryption, and the secrecy of the key information is critical to security protection of the entire system. In conventional practice, key information is furnished from an external source, and the key information furnished externally must be strictly controlled by an individual person for ensuring system security.

According to the present invention, key information necessary for encryption is generated in a semiconductor device, and the key information thus generated is retained in the semiconductor device only. When the key information needs to be output from the semiconductor device, it is delivered using means recognizable only by a particular party. Random numbers are used for generation of key information. In logic-based generation of random numbers, pseudo-random numbers are generated commonly. That is to say, using certain seed information, a plurality of calculations are repeated to determine a sequence of discrete numbers. However, in this kind of random number generation, discrete numbers are generated in an identical sequence if the same seed information is used. Therefore, if the same seed information is attainable, it is possible to generate an identical sequence of random numbers in a reproducible fashion. This imposes a requirement for strict control of seed information. According to the present invention, there is provided a random number generator (118) to obviate the above-mentioned disadvantage.

FIG. 7 shows an exemplary configuration of the random number generator (118) for generating random numbers through the use of a physical phenomenon. The random number generator (118) shown in FIG. 7 generates random numbers using noise produced by a constant-voltage diode or a Zener diode. As illustrated in FIG. 7, the random number generator (118) comprises a low-pass filter (704) including a constant-voltage diode (701), a resistor (702) and a capacitor (703), a comparator (705), and a flip-flop (706).

The constant-voltage diode (701) produces noise having a signal waveform (707). This noise is caused by the physical phenomenon that an avalanche breakdown occurs randomly at a semiconductor junction inside the constant-voltage diode (701). The noise thus produced is fed through the low-pass filter (704) to yield a signal waveform (708) which has a value approximating to the average value of the signal waveform (707). These two signal waveforms (708) and (707) are input to the comparator (705) for conversion into a binary signal having random pulse widths such as a signal waveform (709). The binary signal thus attained is further applied to the flip-flop (706), in which it is synchronized with a reference clock signal available in the semiconductor device. Thus, a random-bit signal waveform (710) is provided.

Random numbers are generated by inputting a necessary length of the random-bit string to a shift register or by counting the number of random pulses in a time unit.

Non-reproducible random numbers can thus be attained without using seed information which is required in common practice of random number generation. Further, through the low-pass filter (704), the average value (708) of the signal containing noise (707) is determined, and the average value thus determined is compared with the signal containing noise. Thus, in the random number generator, an adverse effect on random number generation can be prevented even if voltage fluctuations occur due to such a cause as temperature variation in the constant-voltage diode.

While the constant-voltage diode is used as a noise source in the preferred embodiment illustrated in FIG. 7, it is to be understood that the present invention is not limited to the use of the constant-voltage diode and that any circuit producing noise based on a physical phenomenon may be used instead thereof.

Figure 8:
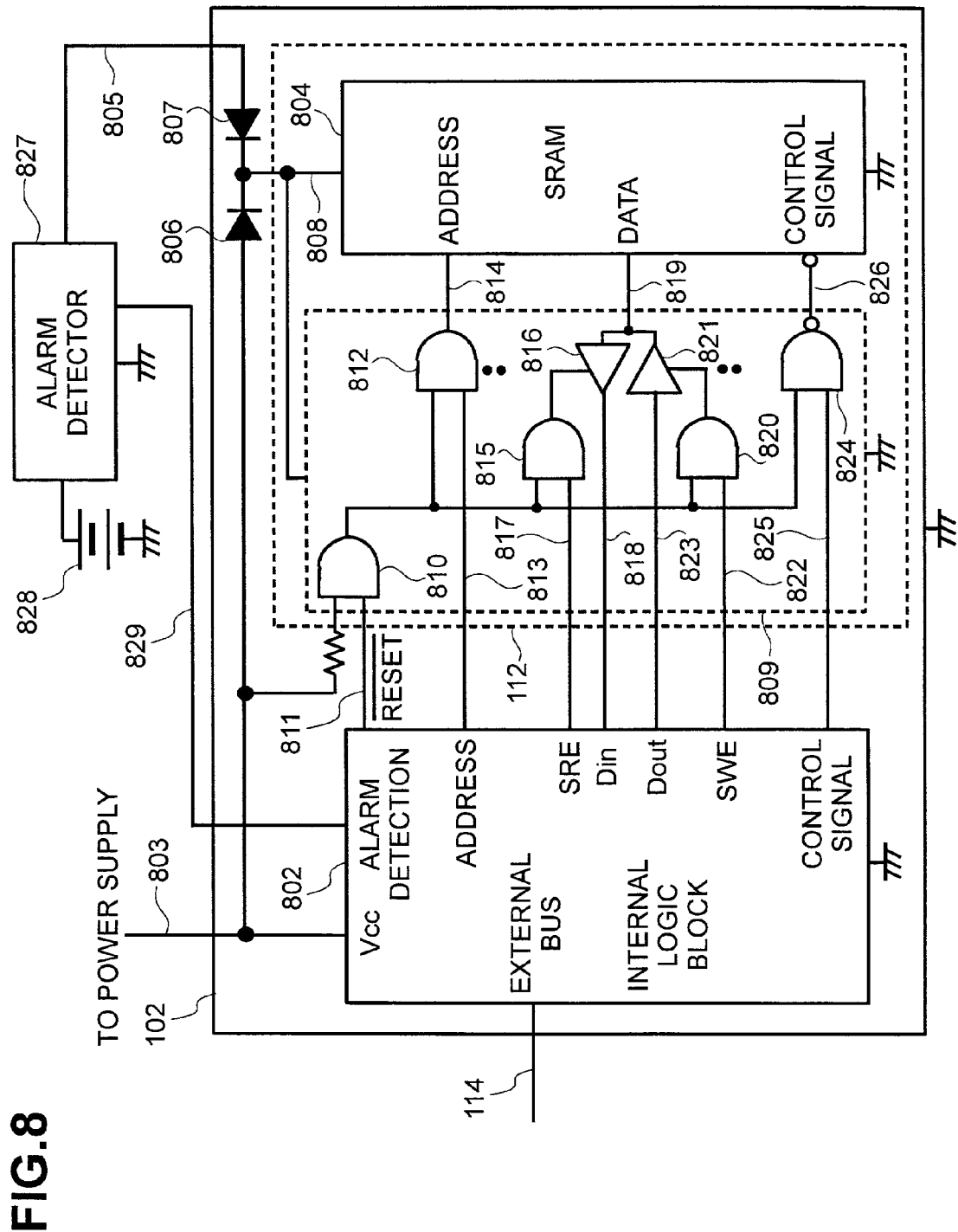
FIG. 8 is a diagram showing a configuration of a key custody area.

Referring to FIG. 8, there is shown an exemplary configuration of the key custody area for storing generated key information in secrecy. The key custody area (112) shown in FIG. 8 is an example of a battery-backed SRAM configuration.

The CPU (102) of the present invention is divided into the following sections; an SRAM (804), an SRAM control circuit (809), and a CPU internal logic block (802) for other circuits. A power supply (805) dedicated for the SRAM (804) and the SRAM control circuit (809), and a main power supply (803) dedicated for the internal logic block (802) are provided. The main power supply (803) and the power supply (805) for the key custody area (112) are connected to the SRAM (804) through diodes (806) and (807) to furnish a power (808) thereto. The power (808) is also furnished to the SRAM control circuit (809). A gate (810) monitors a reset signal (811) and the main power supply (803) used for the internal logic block, and the gate (810) fixedly nullifies all the signals to the SRAM (804) until initialization of the internal logic block is completed with the main power supply (803) turned on. Thus, even under condition that only the key custody area (112) is supplied with power while the other circuits are not supplied with power, it is possible to eliminate an excess leakage current. Further, even if a noise is applied to any part of the circuits not supplied with power or even if a malfunction occurs due to a voltage lower than a guaranteed level, an adverse effect can be shut off. When the gate (810) outputs a "Low" signal, a gate (812) outputs a "Low" signal to provide no change regardless of a voltage level on address signal lines (813). Further, since a gate (815) outputs a "Low" signal, an output impedance of a buffer (816) increases to prevent current leakage to data signal lines (818). Still further, since a gate (820) outputs a "Low" signal, an output impedance of a buffer (821) increases to prevent any data from going to a data signal line (819) regardless of a voltage on data signal lines (823). Still further, a gate (824) outputs a "High" signal to nullify a control signal (826), thereby stopping operation of the SRAM. Further, since gates (810), (812), (815), (820) and (824) and a buffer (821) are formed using CMOS-structure elements, leakage currents to input signals (813), (817), (823), (822) and (825) can be suppressed to a minimum. Therefore, even if power to the internal logic block (802) is suspended, there occurs no leakage of power from the key custody area power supply (805). Thus, power consumption of the key custody area power supply (805) can be restricted to a required minimum, thereby making it possible to prolong the service life of a backup battery (828).

When power is furnished from the main power supply (803) and initialization of the internal logic block (802) is completed, the gate (810) outputs a "High" signal. Then, the gate (812) allows data on the address signal line (813) to flow to the address signal lines (814). Under condition that an SRAM read signal (817) is effective, the gate (815) enables the buffer (816) for allowing data on the data signal line (819) to go to a data signal lines (818). Under condition that an SRAM write signal (822) is effective, the gate (820) enables the buffer (821) for allowing data on the data signal lines (823) to flow to the data signal lines (819). The gate (824) allows data on the control signal line (825) to flow to the control signal line (826). Through the above-mentioned sequence, the SRAM (804) can be accessed normally.

Moreover, a variety of sensors are provided on a case or housing in which the CPU (102) is accommodated, and an alarm detector (827) receiving signals from these sensors is provided for controlling the key custody area power supply (805) connected with the battery (828). Upon detection of an abnormality such as disassembling/removing the case or housing, power to the SRAM (804) is stopped to delete key information. Further, under condition that the main power supply (803) is turned on, even if the key custody area power supply (805) is shut off by actuation of the alarm detector (827), power is furnished from the main power supply (803) to the SRAM (804). Therefore, an alarm detection signal (829) is input to the internal logic block (802) to inform occurrence of an abnormality, thus restricting or stopping operation of the CPU (102).

In a modified embodiment, the power supplies to the SRAM (804) may be integrated in the CPU (102). Further, there may also be provided an arrangement wherein the main power supply and battery power supply are integrated in the alarm detector (827) and wherein the power supplies to the SRAM (804) are shut off upon detection of any abnormality.

In terms of circuit mounting, it is required to provide each of the signal and power lines between the alarm detector (827) and the CPU (102) along the shortest possible route in an inner layer of a substrate therefor so that probing cannot be made with ease. Further, it is required to provide such a security protective means as connecting a plurality of signal lines along different wiring paths. Thus, even if the information processing apparatus is disassembled, cipher key information cannot be extracted out of the semiconductor device.

In the present invention, two kinds of cipher keys are generated for different purposes; a key necessary for identifying the semiconductor device concerned, and a key used for encrypting information. The former is an authentication key, and the latter is an information enciphering key. A key to be generated frequently is an information enciphering key, i.e., in principle, an information enciphering key is generated each time information is encrypted. An authentication key is generated at a predetermined interval of time, e.g., per month or per year, for use as information for identifying the semiconductor device concerned.

Figure 9:
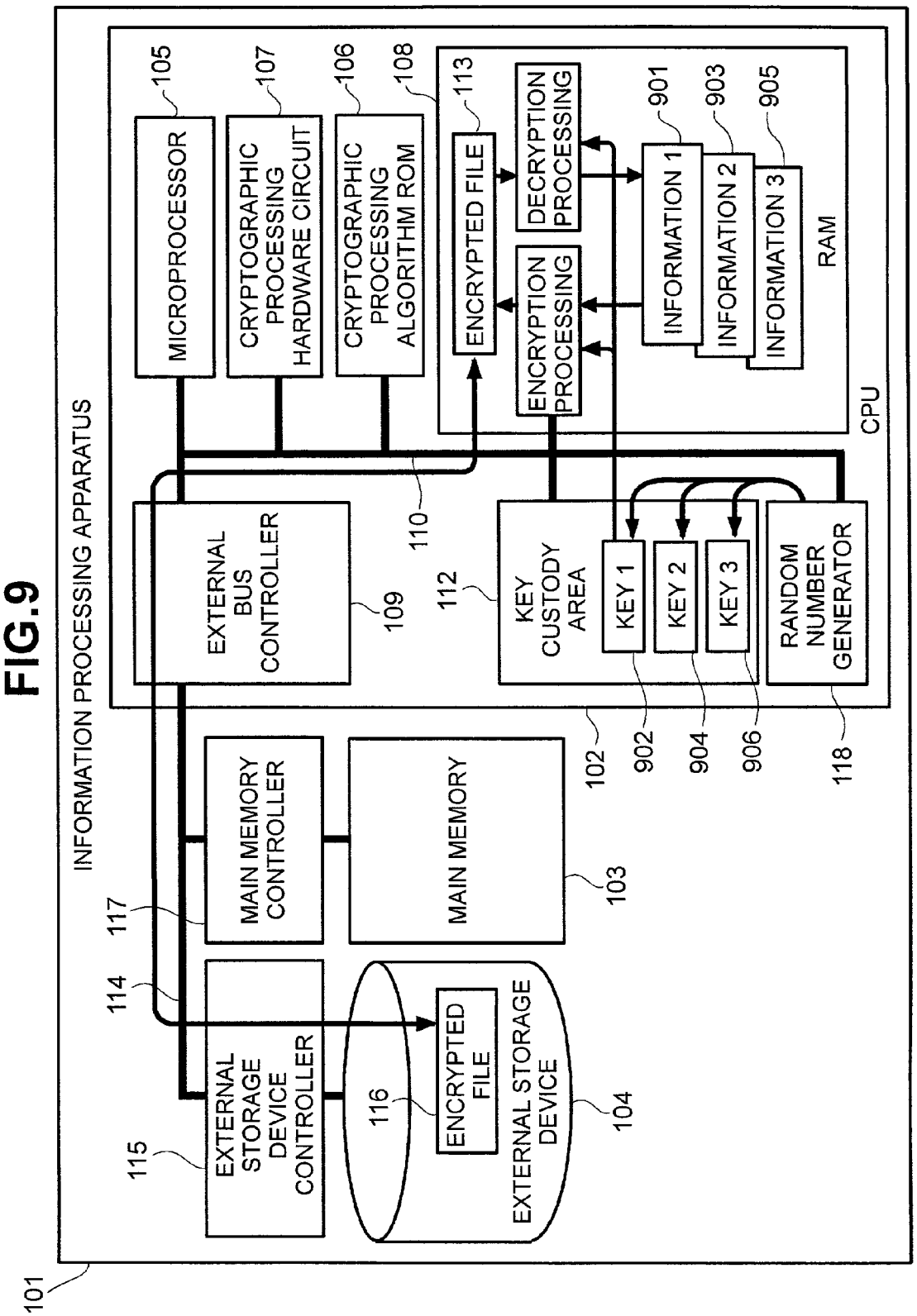
FIG. 9 is a diagram showing a relationship between encryption/decryption processing and key information in a case where encryption and decryption are carried out in the same apparatus.

Referring to FIG. 9, there is shown how enciphering and deciphering keys are handled in a situation where the same information processing apparatus is used for encryption and decryption.

Information (901) produced in the CPU (102) semiconductor chip is encrypted and stored as an encrypted file (116)

into the external storage device (104) or the like. Thereafter, in decryption for using the contents of the encrypted file in the CPU (102) again, it is just required that key information (902) should reside in the CPU (102) only. For making it possible to handle the encrypted files (113) and (116) in the CPU (102) only, the key information (902) is generated by the random number generator (113) in the CPU (102) and stored into the key custody area (112) only.

Further, in a case where different cipher keys (904) and (906) are used for encrypting a plurality of information (903) and (905) respectively, it is required to store key information (904) and (906) into the key custody area (112).

While encryption and decryption are carried out in the memory (108) in the example shown in FIG. 9, there may also be provided such an arrangement that the cryptographic algorithm ROM (106) or the cryptographic processing hardware circuit (107) is used for encryption and decryption in the CPU (102).

Figure 10:
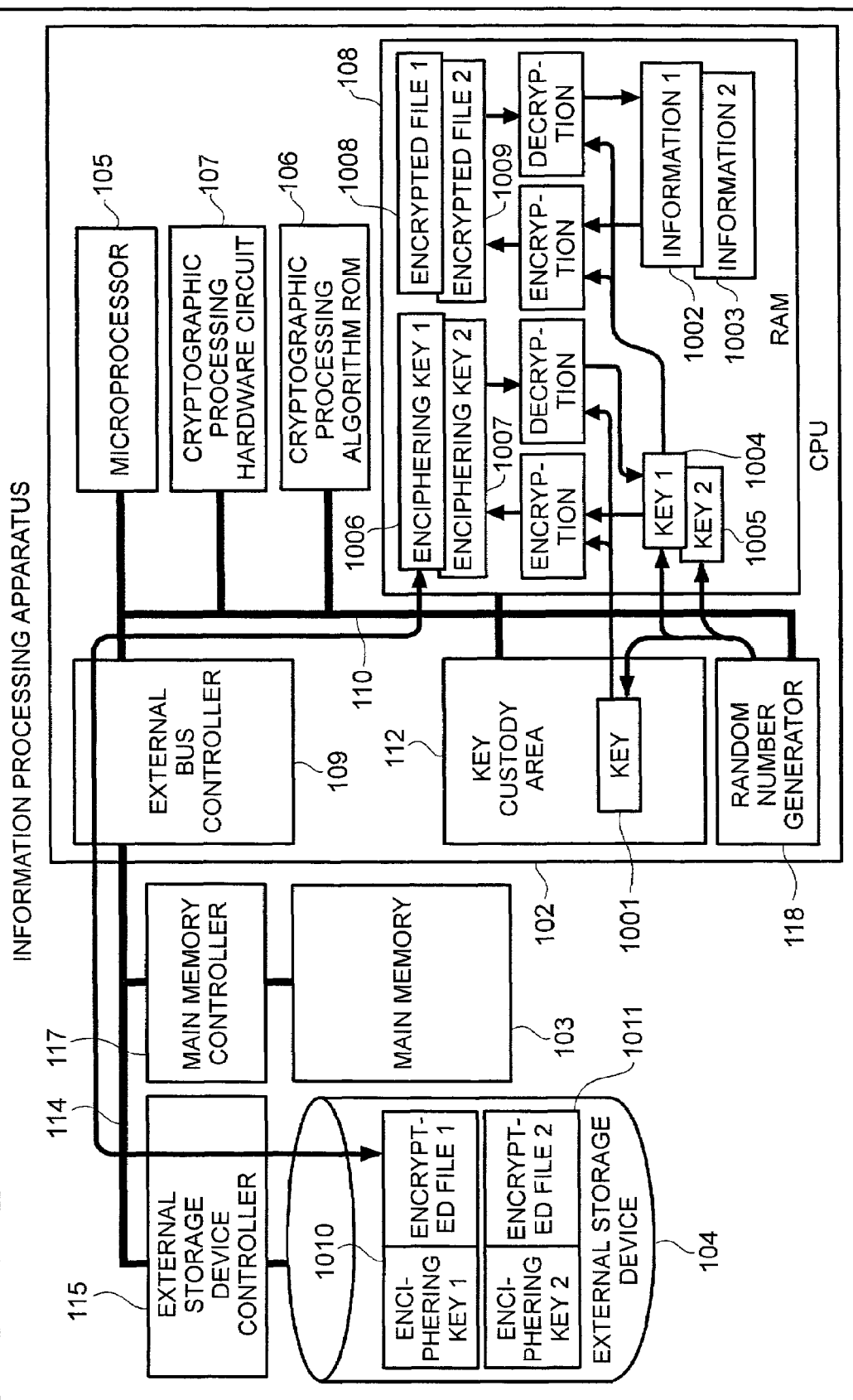
FIG. 10 is a diagram showing a configuration in which the amount of key information to be stored is reduced through the use of a different key handling procedure.

Referring to FIG. 10, the key custody area (112) holds just a key (1001) generated by the random number generator (118). In encryption of information (1002) or (1003), a key (1004) or (1005) generated in association therewith is encrypted with the key (1001) to produce a cipher key (1006) or (1007). The information (1002) or (1003) is encrypted with the cipher key (1004) or (1005) thus produced to create an encrypted file (1008) or (1009). The encrypted file (1008) thus created and the cipher key (1006) are collectively stored as a file (1010) into the external storage device, and the encrypted file (1009) thus created and the cipher key (1007) are collectively stored as a file (1011) into the external storage device. In this fashion, the amount of key information to be held in the key custody area (112) can be reduced.

Figure 11:
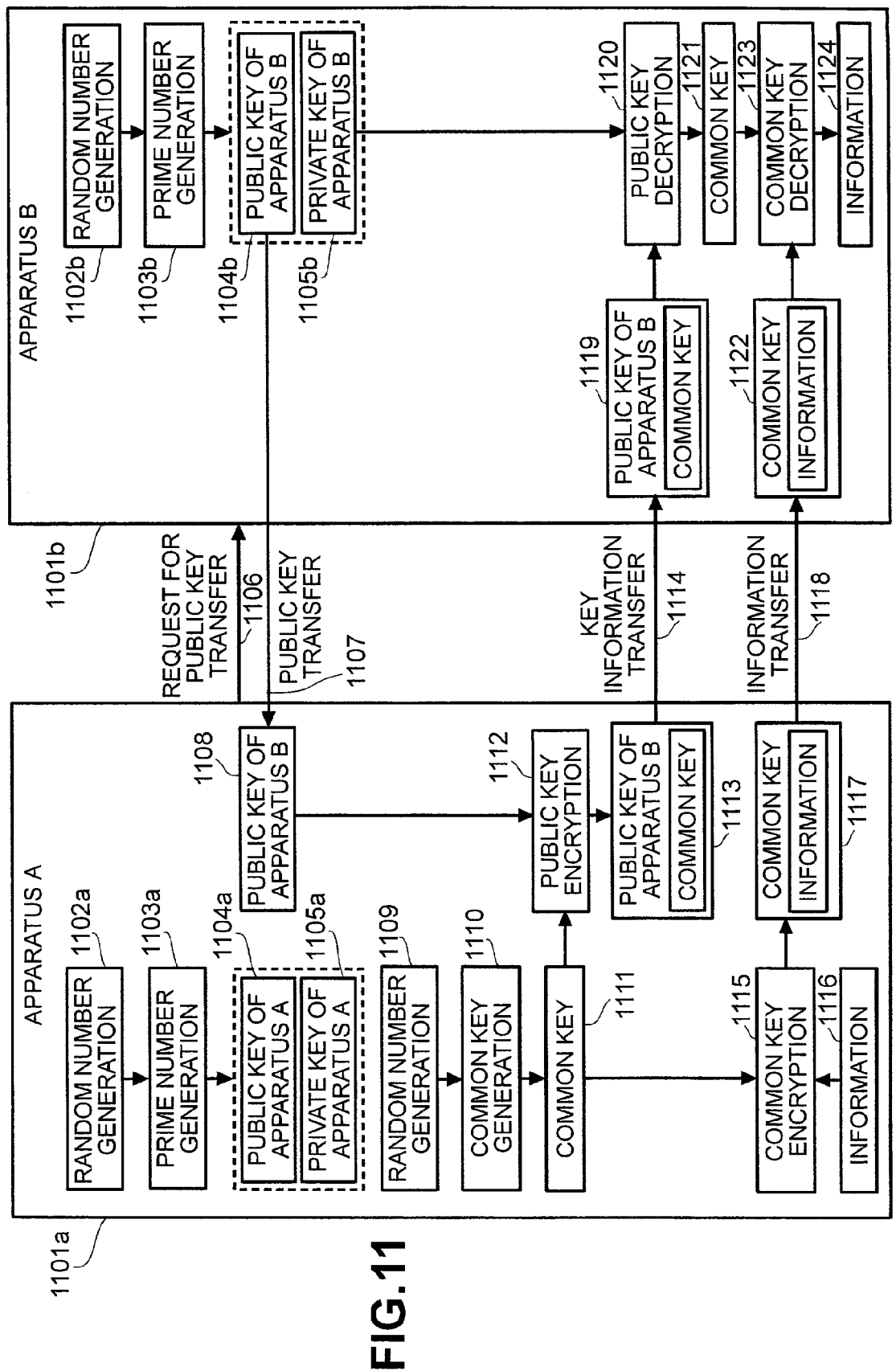
FIG. 11 is a diagram showing a relationship between encryption processing and key information and a relationship between decryption processing and key information in a case where different apparatuses are used for encryption and decryption respectively.

Referring to FIG. 11, there is shown how enciphering and deciphering keys are handled in a situation where different apparatuses are used for encryption and decryption respectively. In this case, it is required to ensure that each communicating party is a correct one. That is to say, it is required to authenticate the identity of each communicating party.

As a means for authenticating the identity of the communicating party, asymmetric key cryptography is employed. In the asymmetric key cryptography, different keys are used for encrypting information to provide a cipher text and for decrypting the cipher text to attain the original information. The asymmetric key cryptography is also referred to as public key cryptography, in which enciphering and deciphering keys are used. One of the enciphering and deciphering keys is made public, and the other is kept secret. Information encrypted with the enciphering key can be decrypted only with the deciphering key corresponding thereto. One of the two keys which is made public is referred to as a public key, and the other one which is kept secret is referred to as a private key. Cipher text information encrypted with the public key can be decrypted only with the private key corresponding thereto, and cipher text information encrypted with the private key can be decrypted only with the public key corresponding thereto. In this cryptographic technique, cipher text information can be transmitted in a form decipherable only by a particular party, and the identity of a sender can be authenticated.

For sending information only to a particular recipient, a sender attains a public key from the recipient first. Then, using the public key of the recipient, the sender encrypts information to be sent. The information thus encrypted is a cipher text which can be decrypted only with a private key kept secret at the recipient, not with the same public key. In this manner, the encrypted information can be sent to the particular recipient securely. In general, since the asymmetric key cryptography (public key cryptography) requires a substantial amount of time due to complex processing thereof, the following cryptographic processing is implemented in most actual applications: Information to be sent is encrypted by symmetric key cryptography (common key cryptography) in which cipher key information is generated through random number generation each time. Using asymmetric key cryptography (public key cryptography), the cipher key information thus generated is sent to a recipient in secrecy.

For authenticating the identity of a sender, the sender encrypts information itself or any message corresponding thereto (e.g., message digest) with a private key and then sends the encrypted information to a recipient. The recipient attains a public key of the sender, and decrypts the encrypted information with the public key of the sender. In authenticity check, if it is judged that the information has been encrypted with the private key owned only by the sender, the recipient can authenticate the identity of the sender.

In an apparatus A (1101*a*) and an apparatus B (1101*b*) shown in FIG. 11, public keys (1104*a*) and (1104*b*) and private keys (1105*a*) and (1105*b*) are generated respectively as apparatus identification information in advance. In a public key cryptographic technique based on modulo arithmetic, each of these keys is generated using the product of two prime numbers. For this purpose, random number generation (1102*a*) (1102*b*) is performed to generate random numbers. Then, it is checked whether the random numbers thus generated are prime numbers or not. Random prime numbers can thus be attained (1103*a*) (1103*b*). The generated keys are used for identifying the semiconductor devices concerned.

The following describes a situation in which information (1116) is sent from the apparatus A (1101*a*) to the apparatus B (1101*b*).

In transfer of the information (1116) from the apparatus A (1101*a*) to the apparatus B (1101*b*), the apparatus A (1101*a*) encrypts the information (1116) with a key so that the information (1116) can be decrypted only by the apparatus B (1101*b*). It is desirable to use a key effective only for transfer of the information (1116) and another key for transfer of different information. In this usage of keys, even if key information leaks, possible damage can be kept to a minimum. For this purpose, a common key (1111) for encrypting information (1116) to be generated each time must be sent only to the apparatus B.

In implementation of the above-mentioned arrangement, the apparatus A (1101*a*) issues a request for public key transfer (1106). In response to this request, the apparatus B (1101*b*) transfers the public key (1104*b*) to the apparatus A (1101*a*). Then, in the apparatus A (1101*a*), random numbers are generated (1109), and a common key (1111) is generated using the random numbers thus generated (1110). Using the generated common key (1111), a public key of the apparatus B (1108) received from the apparatus B (1101*b*) is subjected to public key encryption (1112) to produce encrypted key information (1113). Further, using the generated common key (1111), the information (1116) is subjected to common key encryption (1115) to produce encrypted information (1117). The encrypted key information (1113) and encrypted information (1117) thus produced are sent to the apparatus B. In this manner, the information (1116) can be sent to the apparatus B in a form decipherable only by the apparatus B. In the apparatus B (1101*b*), the encrypted key information thus received (1119) is subjected to public key decryption (1120) using the private key (1105*b*) of the apparatus B to attain a common key (1121). Further, using the common key (1121), the encrypted information received as mentioned above (1122) is subjected to common key decryption (1123) to attain information (1124).

Figure 12:
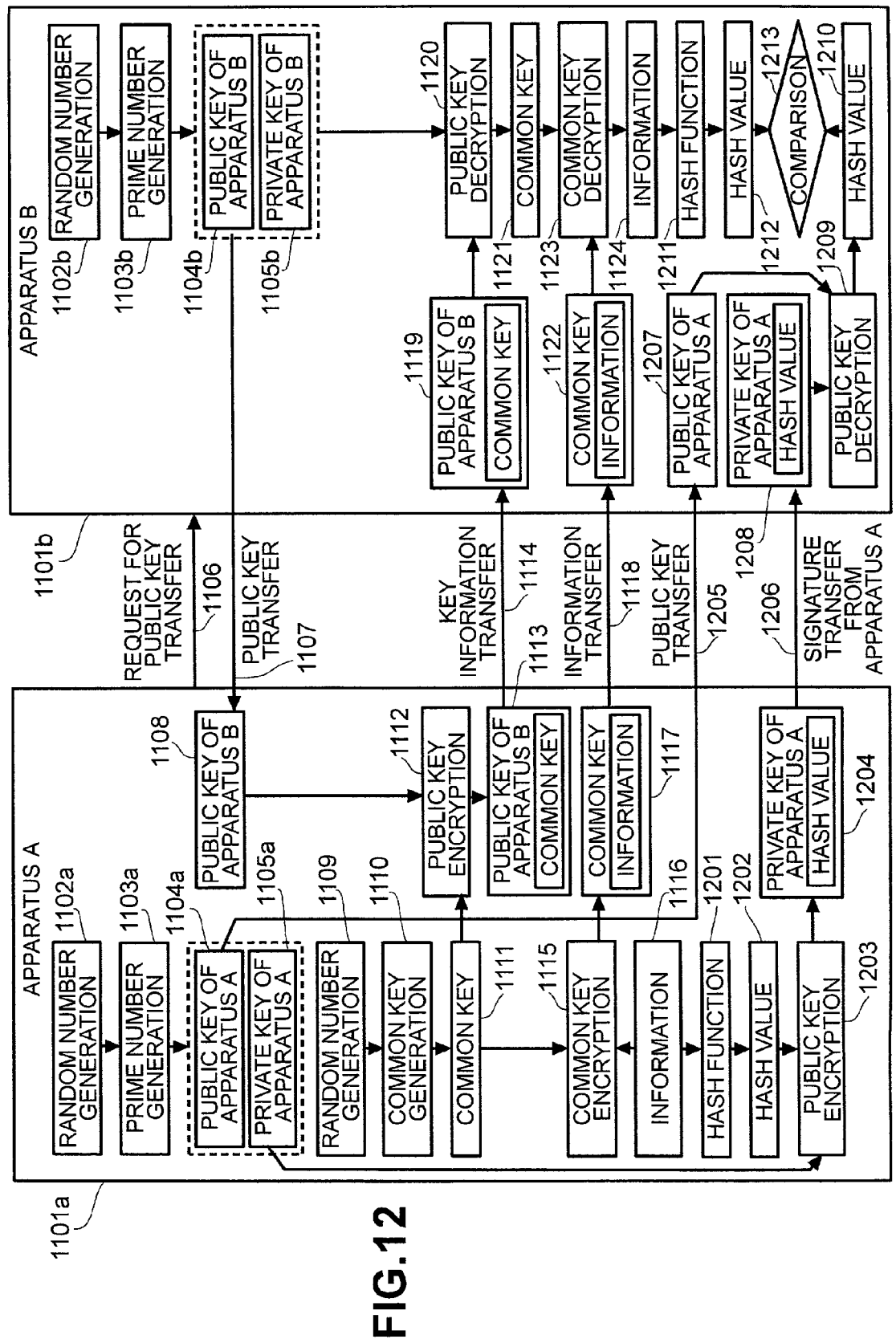
FIG. 12 is a diagram showing a configuration in which authentication information of a sender is added to the arrangement illustrated in FIG. 11.

Moreover, for proving that information transfer (1118) has been made from the apparatus A (1101*a*), a message digest of the information (1116) is determined as a hash value (1202) using a hash function (1201) as shown in FIG. 12. Then, the hash value (1202) thus determined is subjected to public key encryption (1203) using the private key (1105*a*) of the apparatus A to generate an encrypted hash value (1204). The public key (1104*a*) of the apparatus A is transferred (1205) to the apparatus B (1101*b*), and the encrypted hash value (1204) is also transferred to the apparatus B (1101*b*) as a signature of the apparatus A (1101*a*). In the apparatus B (1101*b*), using the public key of the apparatus A received from the apparatus A (1207), the encrypted hash value received therefrom (1208) is subjected to public key decryption (1209) to attain a hash value (1210) corresponding to the hash value generated by the apparatus A (1101*a*). On the other hand, using a hash function (1211), a hash value (1212) is determined from the information (1124) received from the apparatus A (1101*a*). The two hash values (1210) and (1212) mentioned above are compared (1213) to check whether they are identical or not. If a match is found therebetween, it can be verified that the sender of the information (1124) is the apparatus A (1101*a*).

While a hash value of the information (1116) is determined in the arrangement exemplified in FIG. 12, there may also be provided such a modified arrangement that the information itself (1116) is encrypted with the private key (1105*a*) of the apparatus A and the encrypted information is transferred to the apparatus B (1110*b*) together with the public key (1104*a*) of the apparatus A. In particular, this modified arrangement is preferable in a case where the size of the information (1116) is relatively small.

In acquisition of a public key of a desired communicating party, the public key may be attained directly from the communicating party as illustrated in the above-mentioned preferred embodiments, or the public key of the communicating party may be attained through a third party having no interest in relation with the communicating party.

As to a public key attained from each communicating party, it is necessary to ensure that the attained public key is authentic, i.e., the communicating party is not an imposter.

Figure 13:
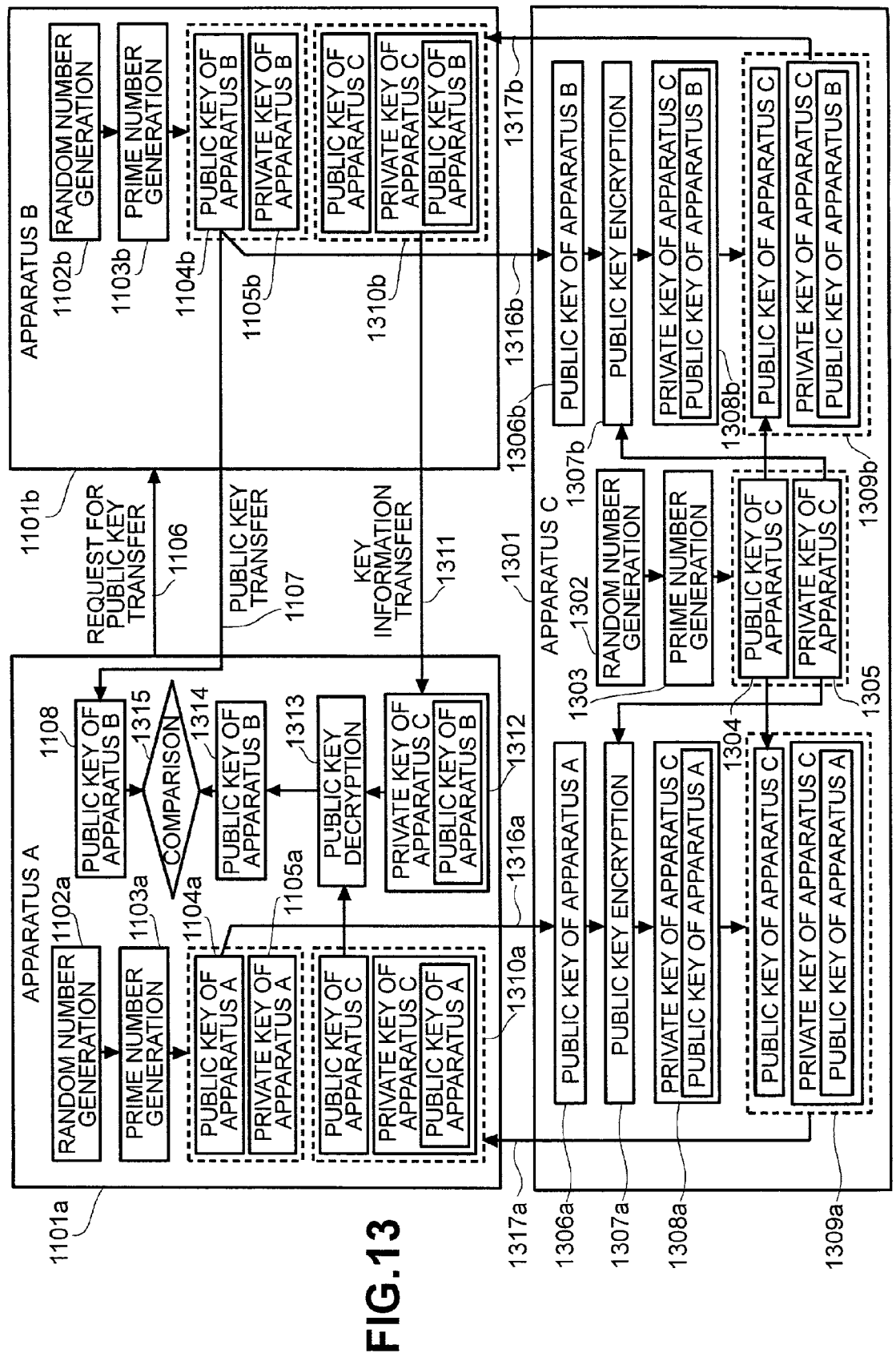
FIG. 13 is a diagram showing a mechanism for authenticating key information attained from a communicating party.

Referring to FIG. 13, there is shown an arrangement for checking whether the public key received from each communicating party in the preferred embodiments shown in FIGS. 11 and 12 is authentic or not. In the arrangement shown in FIG. 13, an apparatus C (1301) is provided as a certification authority server for authenticating the identity of each terminal apparatus. The apparatus C (1301) authenticates a public key of each apparatus subscribing to the communication system concerned. For his purpose, in the apparatus C (1301), random numbers are generated (1302), and from the generated random numbers, prime numbers are taken (1303). Then, using the prime numbers, a public key (1304) and a private key (1305) of the apparatus C are generated. The private key of the apparatus C must be kept in absolute secrecy for ensuring the security of the communication system concerned.

In the apparatus A (1101*a*) and the apparatus B (1101*b*), the public keys (1104*a*) and (1104*b*) and the private keys (1105*a*) and (1105*b*) are generated for apparatus identification as mentioned before. Then, each of the public keys is transferred to the apparatus C (1301) to make a request for certification (1316*a*) (1316*b*). Upon receiving the request for certification, the apparatus C (1301) processes the public key (1306*a*) (1306*b*) of each of the apparatuses A and B through public key encryption (1307*a*) (1307*b*) using the private key (1305) of the apparatus C to produce a certificate (1308*a*) (1308*b*). The certificate thus produced and the public key (1304) of the apparatus C are combined to provide the result of certification (1309*a*), which is then transferred to each of the apparatuses A and B (1317*a*) (1317*b*).

In each of the apparatuses A and B, the result of certification, i.e., a certificate of the public key thereof is stored. When the apparatus B receives a request for public key transfer from the apparatus A for sending information, the apparatus B transfers the public key (1105*b*) thereof and the certificate thereof to the apparatus A. The certificate thus transferred indicates that the apparatus B has been certified by the apparatus C. When the apparatus A receives the certificate (1312), public key decryption (1313) is performed using the public key of the apparatus C stored in the apparatus A. Then, the public key (1314) of the apparatus B is extracted from the certificate (1312), and the public key thus extracted is compared with the public key (1108) transferred from the apparatus B (1101*b*). In this manner, the authenticity of the public key of the apparatus B can be verified.

In certification by the apparatus C using the public key of each of the apparatuses A and B, electronic verification and meticulous inspection are carried out to make sure that each of the apparatuses A and B is not modified or tampered by any third party.

Through the above-mentioned procedure, the authenticity of the public key of each communicating party can be ensured.

Figure 14:
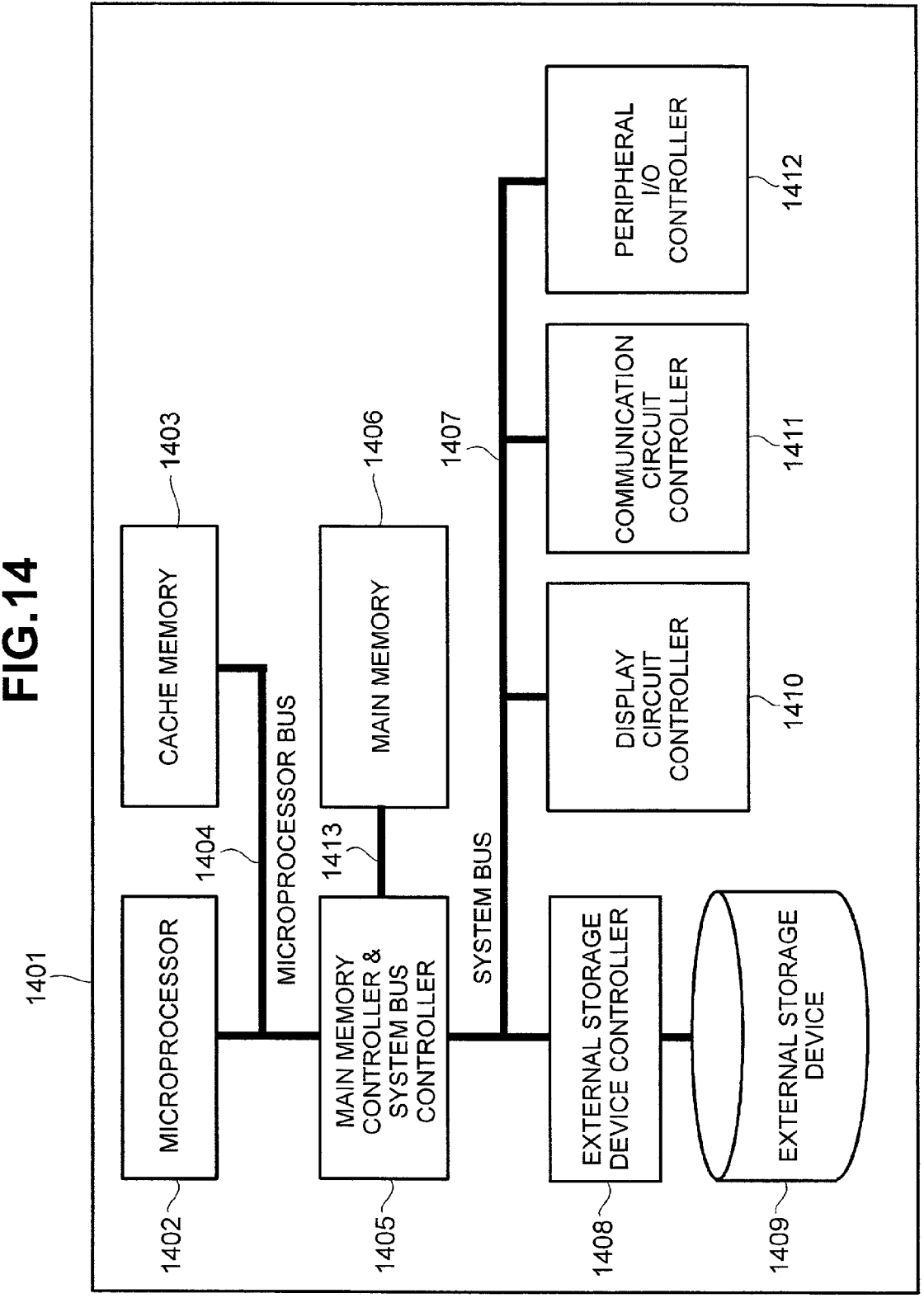
FIG. 14 is a diagram showing a configuration in a case where the present invention is applied to a processor bus and a system information processing apparatus.

Then, with reference to FIG. 14, the following describes a fourth preferred embodiment of the present invention.

In FIG. 14, there is shown a schematic configuration of a typical information processing apparatus. An information processing apparatus (1401) comprises a plurality of semiconductor devices. A CPU (1402) is connected to a cache memory and a main memory controller (1405) through a processor bus (1404). The main memory controller (1405), including a system bus controller, is provided with a memory bus (1413) and a system bus (1407). The memory bus (1413) is extended to a main memory (1406), and the system bus (1407) is extended to an external storage device controller (1408), a display circuit controller (1410), a communication circuit controller (1411), and a peripheral I/O controller (1412). The display circuit controller (1410) may be connected to the main memory controller including the system bus controller (1405). The external storage device controller (1408) is connected to an external storage device (1409).

Since an address region of the main memory (1406) is different from that of each component connected to the system bus (1407), the main memory controller including the system bus controller (1405) conducts a changeover in address region access.

Figure 19:
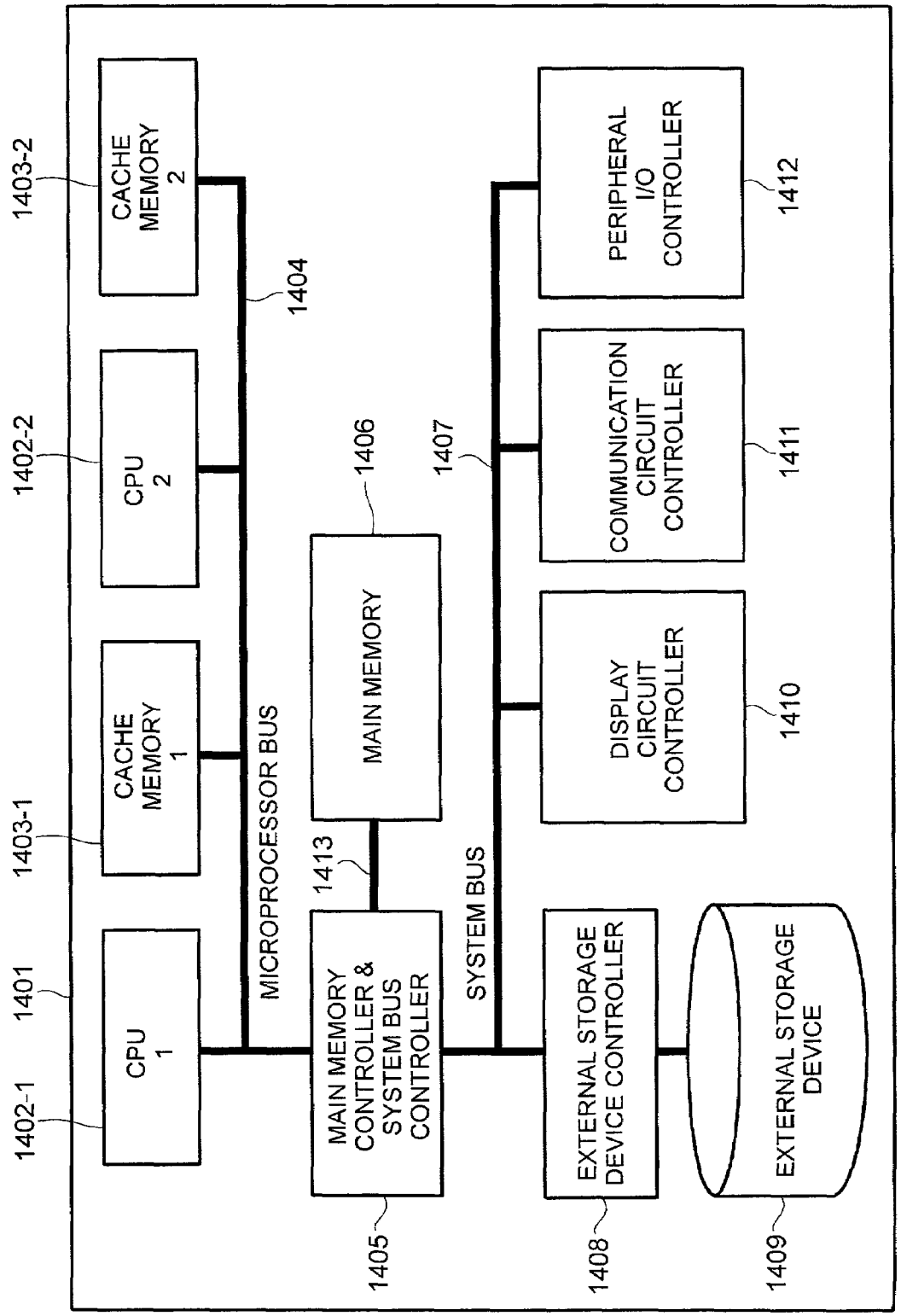
FIG. 19 is a diagram showing an information processing apparatus comprising a plurality of CPUs in a preferred embodiment of the present invention.
Figure 20:
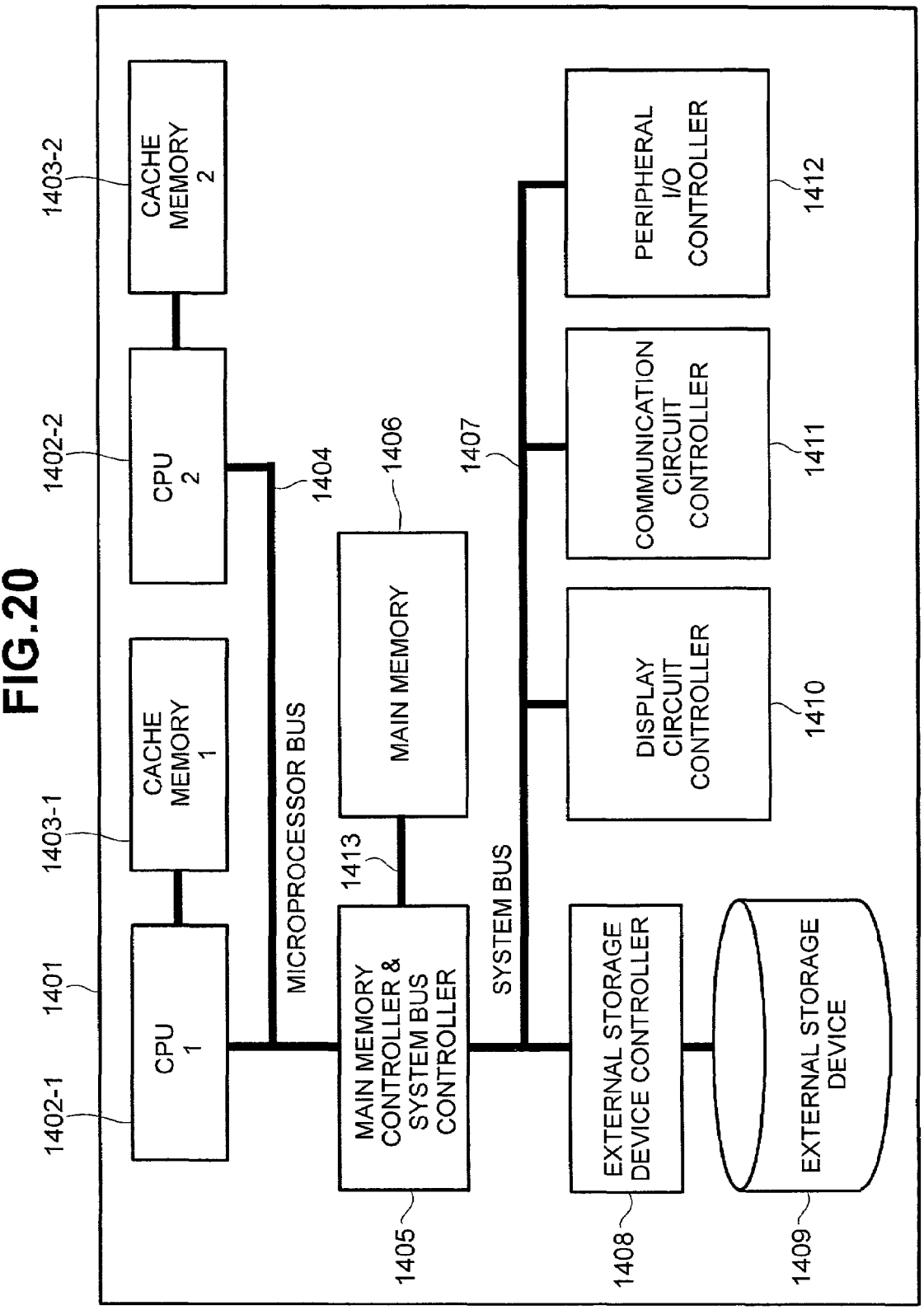
FIG. 20 is a diagram showing a modified embodiment of the arrangement illustrated in FIG. 19.

In the information processing apparatus (1401) which can be regarded as a system, the CPU (1402) serves as a main processor presiding over operations in the system. According to the present invention, cryptographic processing is carried out in the CPU in a closed fashion. For example, as shown in FIG. 1, the CPU (1402) comprises the microprocessor (105), cryptographic processing algorithm ROM (106), cryptographic processing hardware circuit (107), RAM (108), key custody area (112), and external bus controller (109), which are all integrated on a single semiconductor chip. Further, according to the present invention, an information processing apparatus comprising a plurality of CPUs may be used as shown in FIGS. 19 and 20.

Figure 15:
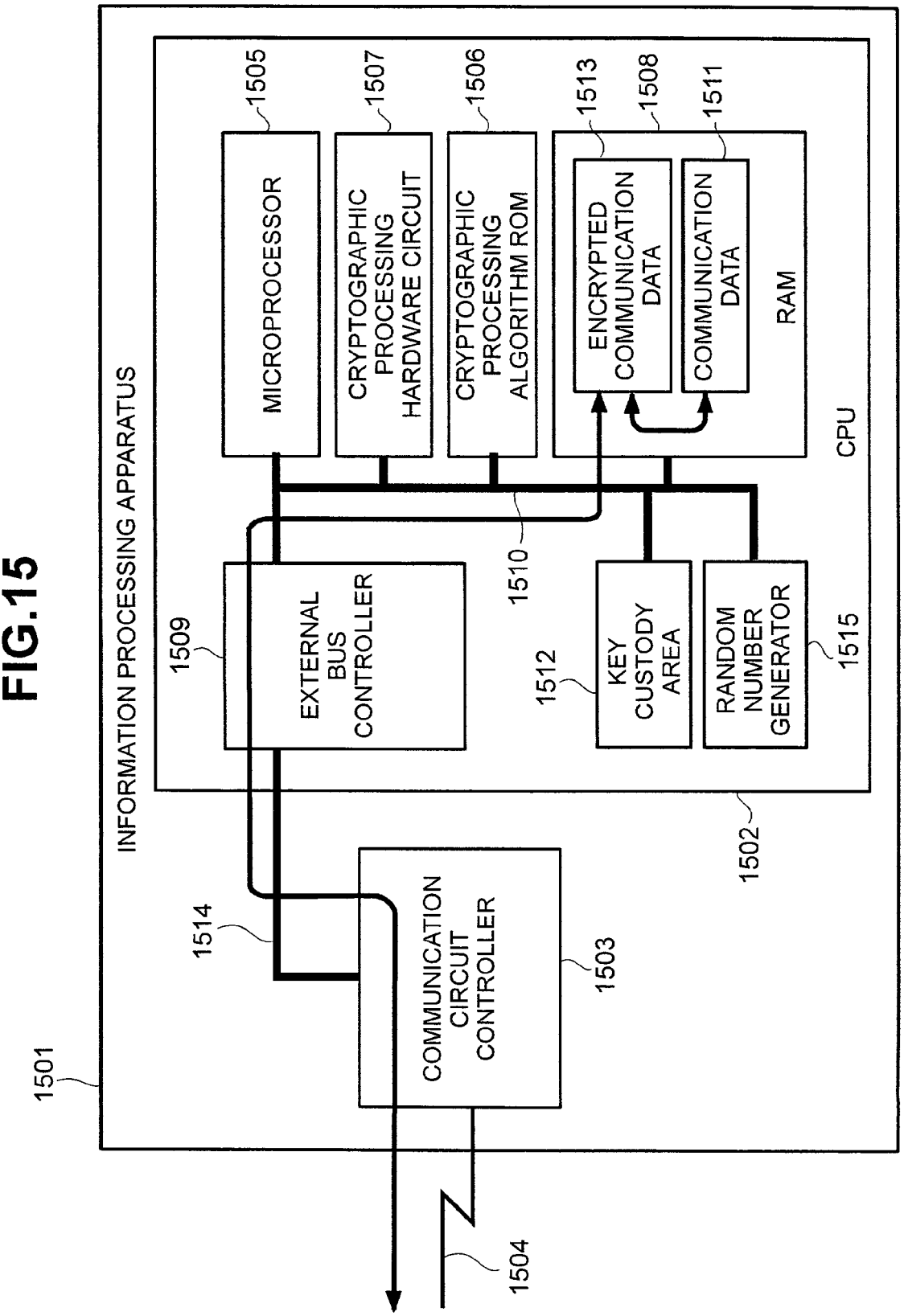
FIG. 15 is a diagram showing a configuration in a case where the present invention is employed for a communication application.

With reference to FIG. 15, the following describes a fifth preferred embodiment of the present invention.

In the fifth preferred embodiment shown in FIG. 15, an information processing apparatus (1501) is connected to another information processing apparatus for communication therewith. In lieu of the external storage device indicated in FIG. 1, a communication circuit controller is provided in the fifth preferred embodiment. The communication circuit controller may be disposed outside the information processing apparatus (1501).

The information processing apparatus (1501) comprises a CPU (1502) and a communication circuit controller (1503), which are interconnected through a system bus (1514). The CPU (1502) includes a microprocessor (1505), a cryptographic processing algorithm ROM (1506), a cryptographic processing hardware circuit (1507), a RAM (1508), an external bus controller (1509), and a key custody area (1512). These component circuits are interconnected through a microprocessor bus (1510).

While the information processing apparatus shown in FIG. 15 comprises the CPU and the communication circuit controller, other components such as a main memory and an external storage device may be included in the information processing apparatus. At the end of a communication line (1504) extended through the communication circuit controller (1503), there maybe connected an apparatus which is functionally equivalent to an external storage device or an information processing apparatus.

Note, however, that a cryptographic processing procedure differs depending on whether an external storage device or an information processing apparatus is connected at the end of the communication line (1504).

In a case where an external storage device is connected at the end of the communication line, data is encrypted and the resultant encrypted data is stored into the external storage device. Then, the encrypted data is read out of the external storage device for decryption. Therefore, it is just required that only the CPU of the information processing apparatus where cryptographic processing is performed should retain an enciphering key.

In a case where an information processing apparatus is connected at the end of the communication line, i.e., an information processing apparatus A and an information processing apparatus B are connected through the communication line, there may occur a situation in which data is encrypted in the information processing apparatus A and then the encrypted data is decrypted in the information processing apparatus B. Common key cryptography is suitable for high-speed encryption/decryption of a large amount of data. In the common key cryptography, since the same key is used for encryption and decryption, the information processing apparatuses A and B must have an identical key. The identical key may be set in advance in each of the information processing apparatuses A and B. Alternatively, before transmission of encrypted data, mutual authentication may be made between the information processing apparatuses A and B in a fashion that an enciphering key is shared therebetween. For the mutual authentication, cryptographic processing is carried out in the CPU.

FIG. 23 shows a scheme in which the information processing apparatuses A and B are connected over a network.

In the RAM (1508), encrypted data is re-edited per communication, and according to a communication protocol, the re-edited data is transferred to the communication circuit controller (1503) to enable secure communication. There may be provided such a modified arrangement as mentioned below: Data encrypted in the RAM (1508) is transferred to the communication circuit controller (1503), and in the communication circuit controller (1503), the encrypted data is re-edited per communication. Then, according to a communication protocol, the re-edited data is sent over the communication line (1504).

With reference to FIGS. 16, 17, 18, 21 and 22, the following describes a sixth preferred embodiment of the present invention.

Figure 16:
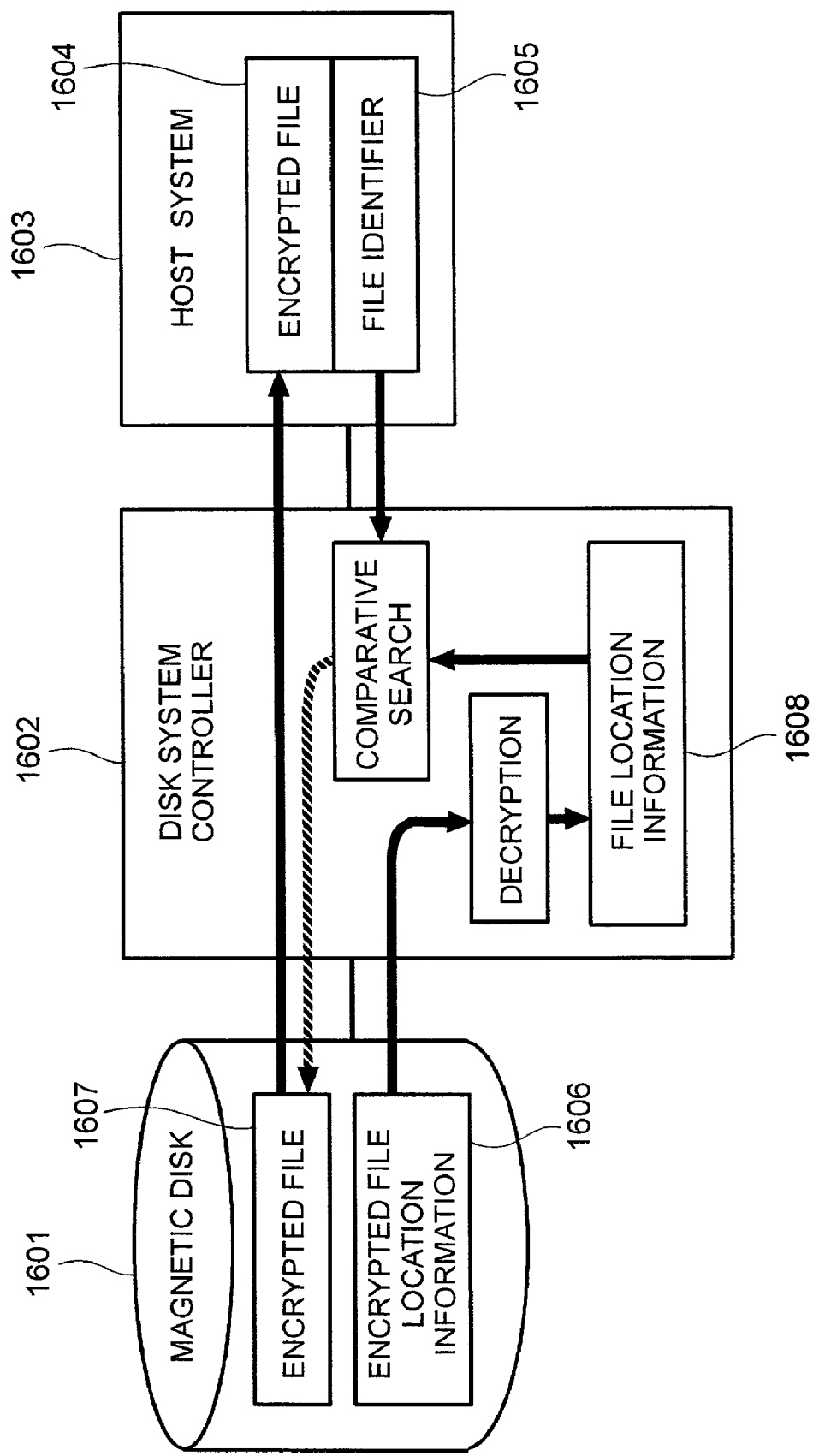
FIG. 16 is an explanatory diagram showing a configuration in a case where the present invention is applied to an external storage device.

In FIG. 16, there is shown a configuration in which a group of external storages including a magnetic disk (1601) is controlled by a disk system controller (1602). The disk system controller (1602) is connected to a host system (1603) which is a higher-ranking information apparatus.

The magnetic disk (1601) contains data stored as a file and file location information indicating where the file is stored on the magnetic disk. In a small-type information processing apparatus such as a personal computer, a file system program for managing files and file location information may be carried out by a CPU contained in the small-type information processing apparatus. In a disk system controller designed for implementing high-speed operations with high reliability, the disk system controller itself may manage files and file location information.

The sixth preferred embodiment of the present invention is particularly suitable for the latter case. In the host system, a file (1604) and a file identifier (1605) are managed. Whether the file (1604) is encrypted or not depends on the host system, i.e., it is not required for the disk system controller (1602) to be concerned therewith. In the disk system controller (1602), file location information (1606) on the magnetic disk (1601) is encrypted for management.

In the sixth preferred embodiment of the present invention, operations to be performed until the host system reads out an encrypted file (1607) are as follows:

First, the host system sends a file identifier (1605) corresponding to a necessary encrypted file to the disk system controller (1602), thereby indicating a request for reading out the encrypted file. Upon receipt of this request, the disk system controller (1602) reads the encrypted file location information (1606) out of the magnetic disk (1601). In the disk system controller (1602), the encrypted file location information (1606) is decrypted to extract file location information (1608). Then, the disk system controller (1602) searches the extracted file location information (1608) for the file identifier (1605) to attain actual file location information. Using the file location information thus attained, the disk system controller (1602) reads the necessary encrypted file (1607) out of the magnetic disk (1601), which is then transferred to the host system (1603).

Figure 17:
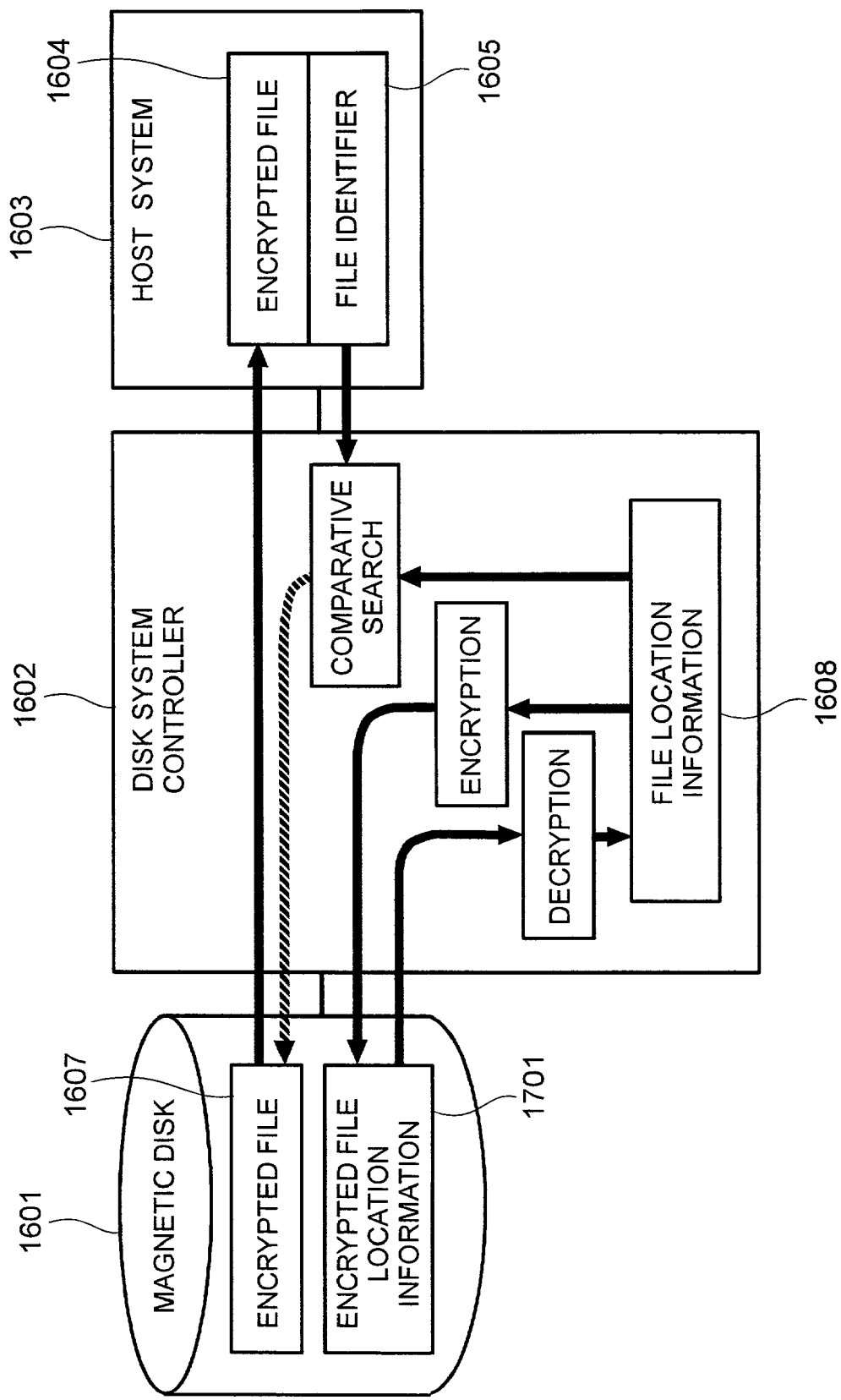
FIG. 17 is a diagram for explaining a flow of writing encrypted file location information in the configuration illustrated in FIG. 16.

With reference to FIG. 17, the following describes how a file is written onto the magnetic disk. Until the file location information (1608) is extracted, the same operations as those in the case of encrypted file reading mentioned above are carried out. Using the extracted file location information (1608), a free space of the magnetic disk (1601) is checked, and then the encrypted file (1604) is written into the free space of the magnetic disk (1601). After completion of writing the encrypted file (1604), the file location information (1608) is updated and encrypted. Thereafter, the encrypted file location information (1701) is written onto the magnetic disk (1601).

Figure 18:
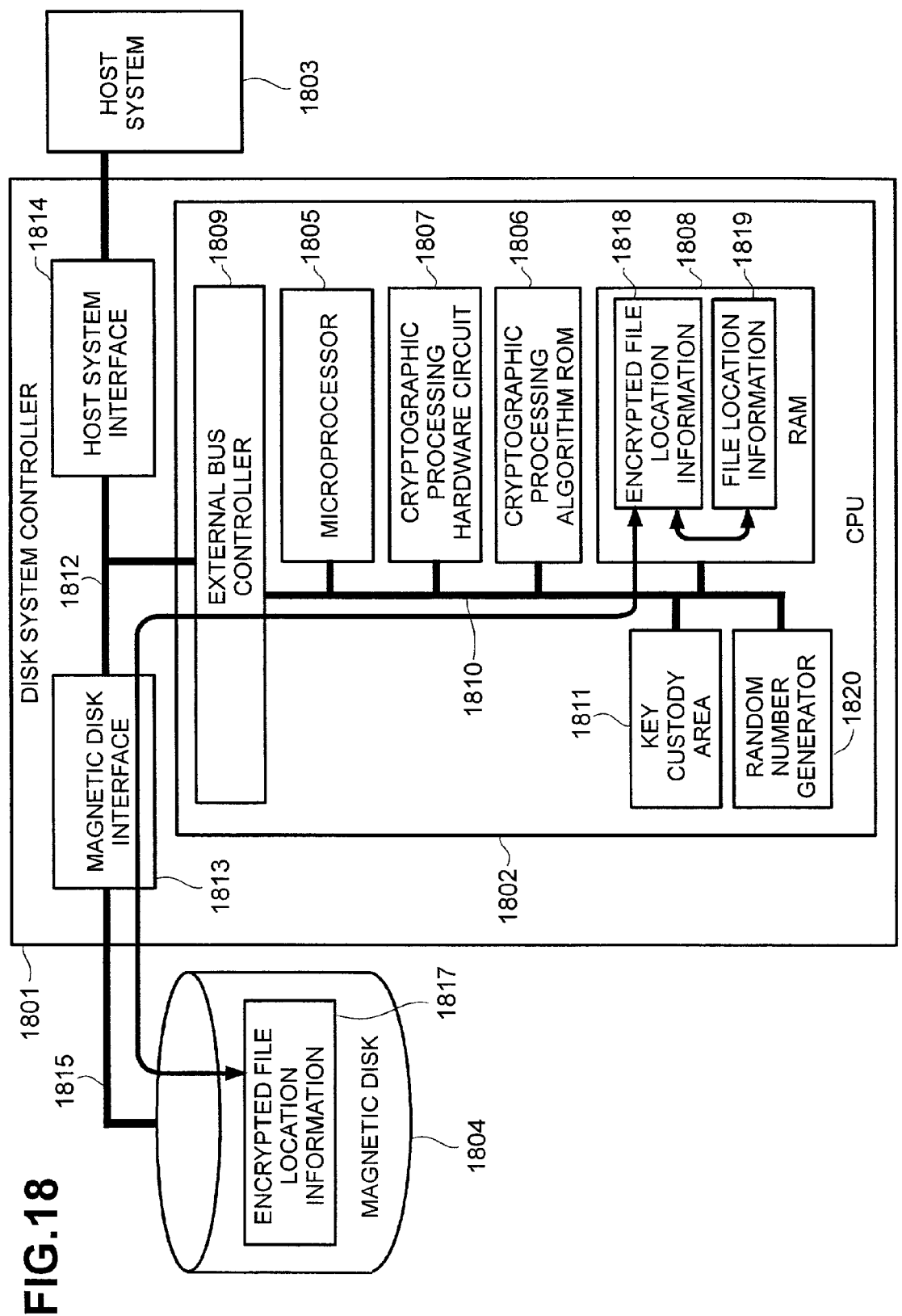
FIG. 18 is a diagram showing a configuration of a disk controller.

With reference to FIG. 18, the following describes a configuration of a disk system controller (1801) according to the present invention.

The disk system controller (1801) of the present invention includes a CPU (1802) serving as an internal disk system processor, a magnetic disk interface (1813), and a host system interface (1814). The CPU (1802) comprises a microprocessor (1805), a cryptographic processing algorithm ROM (1806), a cryptographic processing hardware circuit (1807), a RAM (1808), a key custody area (1811), an external bus controller (1809), and a random number generator (1820).

Figure 21:
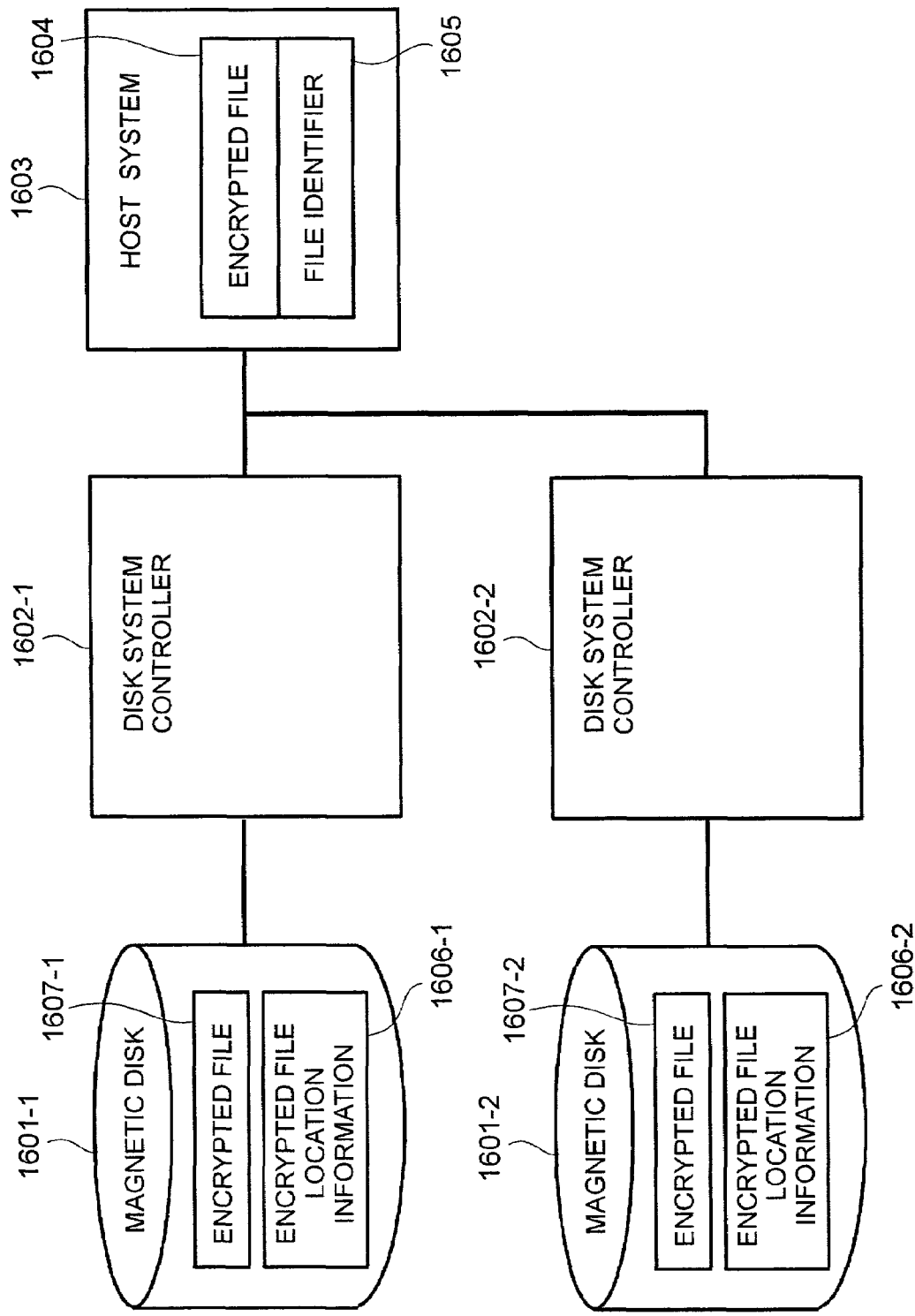
FIG. 21 is a diagram showing a modified embodiment of the configuration illustrated in FIG. 16.
Figure 22:
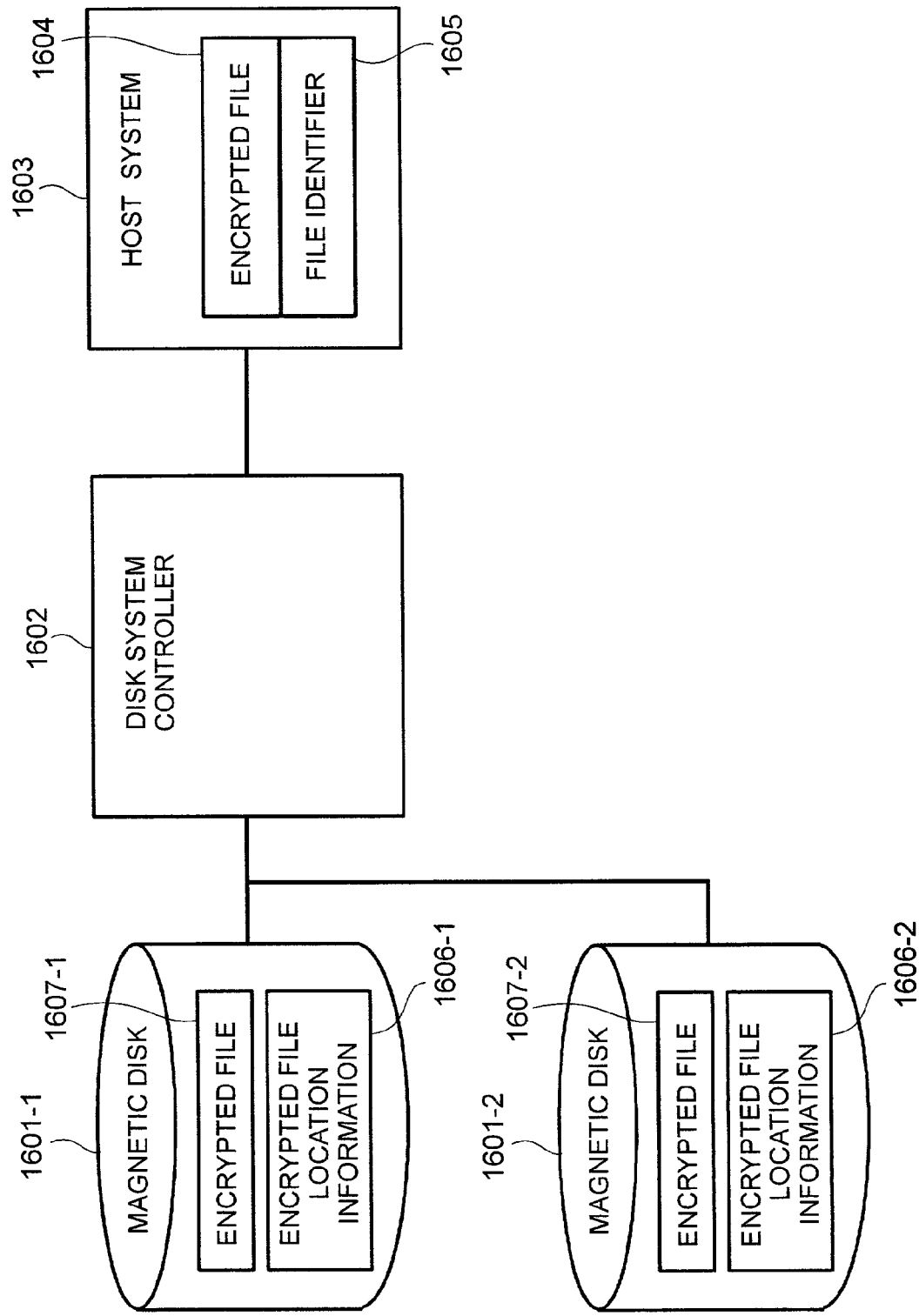
FIG. 22 is a diagram showing another modified embodiment of the configuration illustrated in FIG. 16.

As shown in FIGS. 21 and 22, a plurality of magnetic disk devices may also be connected to an information processing apparatus.

Using a disk system controller such as mentioned above, all the information stored in a magnetic disk can be encrypted to ensure security protection in information storage.

The cryptographic processing hardware circuit of the present invention is a dedicated hardware component for common key cryptography in which a common key is applied to both encryption and decryption. The cryptographic processing hardware circuit comprises a rotator, an adder, an arithmetic logic unit, and other elements. It is also practicable to use such a common key cryptographic method as Multi-series cryptography or M6 cryptography in which bit rotation, addition, and logic operation are primarily performed in units of a certain data length.

In a case where public key cryptography is used, there is provided a modulo arithmetic circuit capable of handling higher computational complexity as a dedicated hardware circuit.

INDUSTRIAL APPLICABILITY

According to the present invention, cryptographic processing can be carried out without outputting sensitive information onto a system bus and processor bus in an information processing apparatus. Since cryptographic processing, sensitive information to be encrypted/decrypted, cryptographic algorithms, intermediate cryptographic results, and cipher key information are kept in a single semiconductor chip, it is possible to provide an information processing apparatus which is highly advantageous in information security protection.

The invention claimed is:

1. An information processing apparatus including,
a processing device for performing predetermined processing of information, and
a bus for interconnecting said processing device and other component devices of said information processing apparatus,
wherein said processing device is integrated on a single semiconductor chip, internally generates first key information and second key information, internally encrypts sensitive information inputted from said bus with said generated second key information, internally encrypts said generated second key information with said generated first key information, and outputs said encrypted sensitive information and said encrypted second key information to said bus without outputting said first key information used for encrypting said second key information to said bus,
wherein said processing device newly generates different second key information each time sensitive information inputted from said bus is encrypted,
wherein said first key information is common to a plurality of said second key information, and
wherein said processing device deletes said first key information in said single semiconductor chip if an abnormality is detected,
wherein said processing device comprises:
a microprocessor for carrying out said predetermined processing;
a generator for generating said first key information;
a cryptographic algorithm memory device for storing an algorithm for information cryptographic processing;
a volatile memory device for storing said generated first key information;
a cryptographic processing device for carrying out cryptographic processing with said algorithm; and
a microprocessor bus for interconnecting said microprocessor, said generator, said cryptographic algorithm memory device, said volatile memory device and said cryptographic processing device,
wherein a power supply to said volatile memory is stopped so as to delete said first key information in said single semiconductor chip if said abnormality is detected, and
wherein said processing device voids a control signal to said volatile memory until an internal logical block in said processing device is finished initializing.

2. An information processing apparatus including,
a processing device for performing predetermined processing of information, and
a bus for interconnecting said processing device and other component devices of said information processing apparatus,
wherein said processing device is integrated on a single semiconductor chip, internally generates first key information and second key information, internally encrypts sensitive information inputted from said bus with said generated second key information, internally encrypts said generated second key information with said generated first key information, and outputs said encrypted sensitive information and said encrypted second key information to said bus without outputting said first key information used for encrypting said second key information to said bus,
wherein said processing device newly generates different second key information each time sensitive information inputted from said bus is encrypted,
wherein said first key information is common to a plurality of said second key information,
wherein said processing device deletes said first key information in said single semiconductor chip if an abnormality is detected,
wherein said processing device comprises a battery backed first RAM for storing said generated first key information and a second RAM for storing said generated second key information, said second RAM including a working area, and
wherein said processing device voids a control signal to said battery backed first RAM until an internal logical block in said processing device is finished initializing.

3. An information processing apparatus as claimed in claim 2,
wherein said processing device comprises an external bus controller for preventing non-encrypted sensitive information from being output onto said bus.

4. An information processing apparatus as claimed in claim 3;
wherein information not requiring encryption is output onto said bus through said external bus controller.

5. An information processing apparatus as claimed in claim 2,
wherein a memory device is provided for storing information encrypted by said processing device.

6. An information processing apparatus as claimed in claim 2,
wherein said processing device comprises means for decrypting encrypted information at an information write operation.

7. An information processing apparatus as claimed in claim 6,
wherein said information processing apparatus is connected to a different information processing apparatus through a network, and
wherein said information processing apparatus decrypts encrypted information which is received from said different information processing apparatus.

8. An information processing apparatus as claimed in claim 2,
wherein a plurality of said processing devices are provided, and cryptographic processing is carried out in each of said processing devices.

9. An information processing apparatus as claimed in claim 2,
wherein said processing device comprises means for receiving an encrypted program and for carrying out decryption thereof.

10. An information processing apparatus as claimed in claim 2,
wherein said abnormality is a disassembly or removal of a case or housing of said processing device.

11. An information processing apparatus as claimed in claim 2,
wherein said first key information is a random number, and
wherein said generator generates said random number based on a signal outputted from a constant voltage diode.

* * * * *